US010803434B2

United States Patent
Smith et al.

(10) Patent No.: US 10,803,434 B2
(45) Date of Patent: Oct. 13, 2020

(54) AUTOMATED STORE TECHNOLOGIES

(71) Applicant: Swyft Inc., San Francisco, CA (US)

(72) Inventors: Gower Smith, San Francisco, CA (US); Lincoln Smith, San Francisco, CA (US)

(73) Assignee: Swyft Inc, San Francisco, CA (US)

( * ) Notice: Subject to any disclaimer, the term of this patent is extended or adjusted under 35 U.S.C. 154(b) by 0 days.

(21) Appl. No.: 16/556,109

(22) Filed: Aug. 29, 2019

(65) Prior Publication Data

US 2020/0082369 A1 Mar. 12, 2020

Related U.S. Application Data

(60) Provisional application No. 62/724,465, filed on Aug. 29, 2018.

(51) Int. Cl.
| | |
|---|---|
| *G06Q 30/00* | (2012.01) |
| *G06Q 20/18* | (2012.01) |
| *G07F 11/06* | (2006.01) |
| *G06Q 20/20* | (2012.01) |
| *G07F 17/00* | (2006.01) |
| *G07C 9/00* | (2020.01) |
| *B65G 1/137* | (2006.01) |
| *G06Q 10/08* | (2012.01) |

(52) U.S. Cl.
CPC ............. *G06Q 20/18* (2013.01); *B65G 1/137* (2013.01); *G06Q 10/087* (2013.01); *G06Q 20/203* (2013.01); *G07C 9/00912* (2013.01); *G07F 11/06* (2013.01); *G07F 17/0028* (2013.01)

(58) Field of Classification Search
CPC ...... G06Q 10/087; G06Q 30/02; G06Q 20/20; G07F 7/00
USPC ................................... 235/383, 385
See application file for complete search history.

(56) References Cited

U.S. PATENT DOCUMENTS

| | | |
|---|---|---|
| 2007/0284442 A1 | 12/2007 | Herskovitz |
| 2008/0061076 A1 | 3/2008 | Hieb et al. |
| 2015/0307279 A1 | 10/2015 | Almada et al. |

OTHER PUBLICATIONS

Notification and Transmittal of International Search Report and Written Opinion, PCT/US2019/048927, dated Nov. 1, 2019, 11 pages.

*Primary Examiner* — Jamara A Franklin

(57) ABSTRACT

Apparatuses and methods provide an automated store with a number of product locations and a fetch and delivery bucket that conveys product from a shelf location to a delivery location. Cameras and sensors within the automated store acquire data that may be stored in a remote database and analyzed to improve the reliability of the delivery process. Camera images may also be used to re-position the fetch and delivery bucket in real time, to provide images of actual, available product to consumers via a remote interface, to determine inventory, and to monitor the activities of replenishers and service personnel, and to generally operate the automated store remotely.

23 Claims, 28 Drawing Sheets

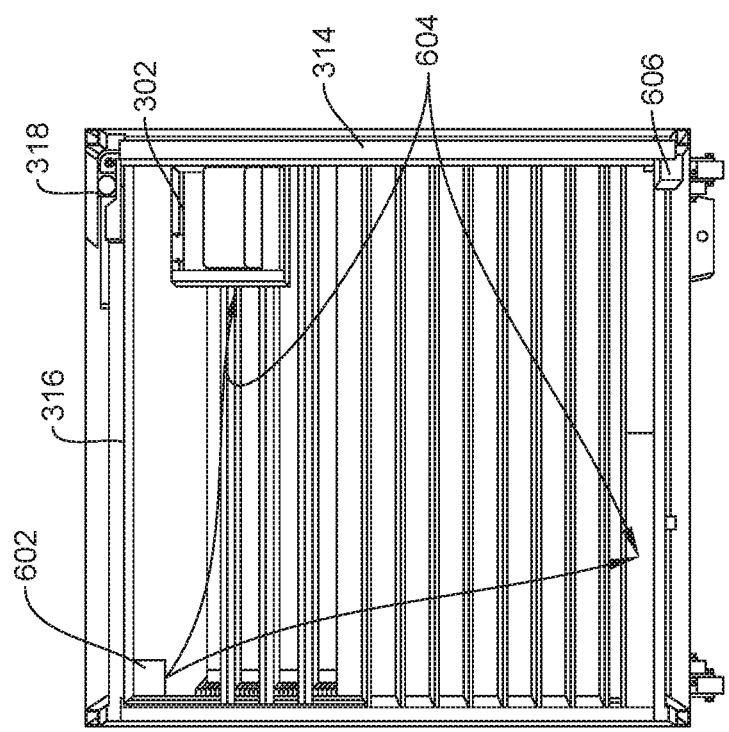
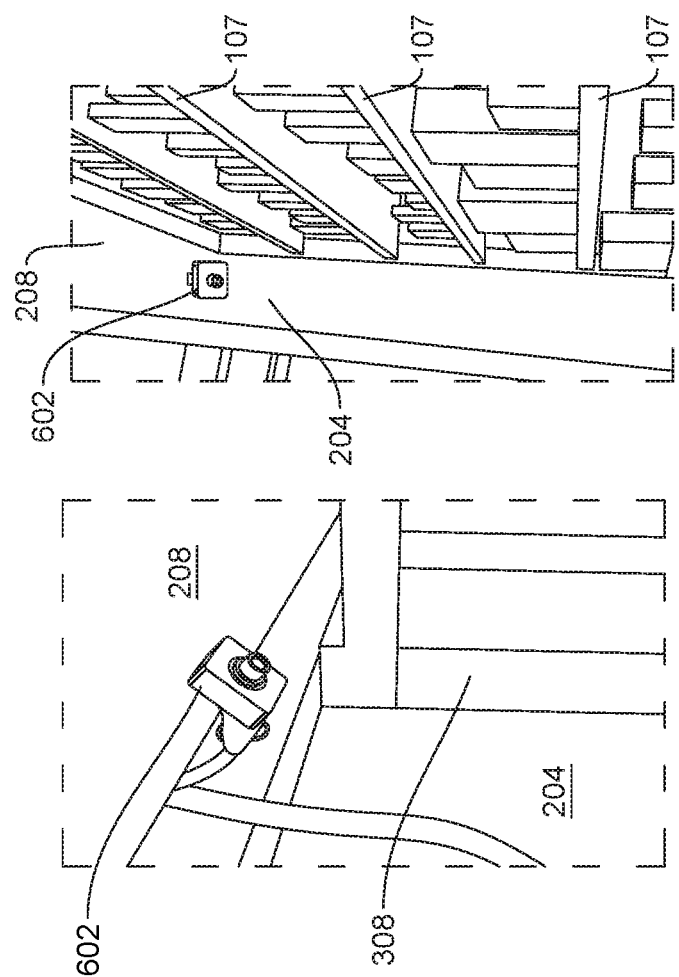
FIG. 6A  FIG. 6B  FIG. 6C

| Stores Remote Exec | | CVS US | |
|---|---|---|---|
| Store ID | Location Name | Live? | Online? |
| CVUS0001 | South Station Bus Terminal | true | false |
| CVUS0002 | LGA-Term B-Conc A | true | true |
| CVUS0003 | CVS HQ | true | true |
| CVUS0004 | Faneuil Hall 1 | true | true |
| CVUS0005 | Faneuil Hall 2 | true | false |
| CVUS0006 | Cross Point | true | true |
| CVUS0007 | Providence Place GGP | true | false |
| CVUS0008 | Christiana Mall GGP | true | false |
| CVUS0009 | Alewife T Station | true | false |
| CVUS0010 | Houston Airport-IAH | true | true |
| CVUS0011 | Westmar Lofts | true | true |
| CVUS0012 | LAS- T3 Baggage-Carousel 26 | true | false |

FIG. 9

1400
From FIG. 14B
▷ Take the Tour
+ Add    × Delete
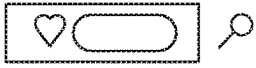
-18.5%
Avg. Attention Time
2.7 seconds        -31.1%
Day
-27.5%
Total Attention Time per day
1.8 K seconds      -38.7%
(Avg. location)
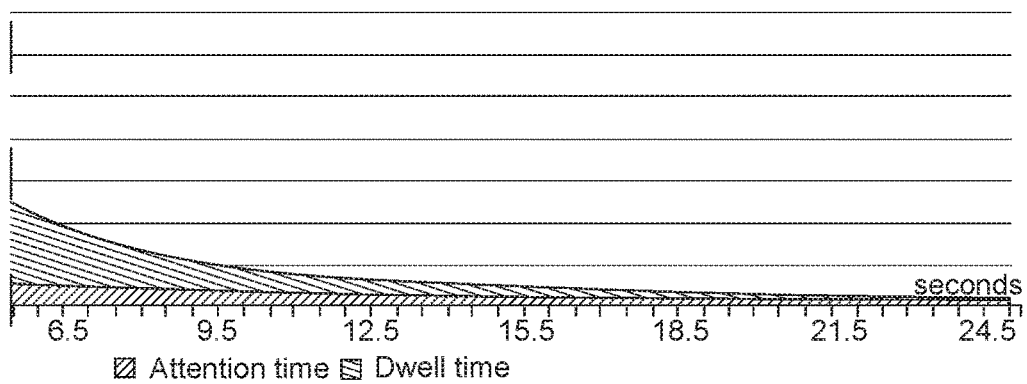
☒ Attention time  ▨ Dwell time
FIG. 14C

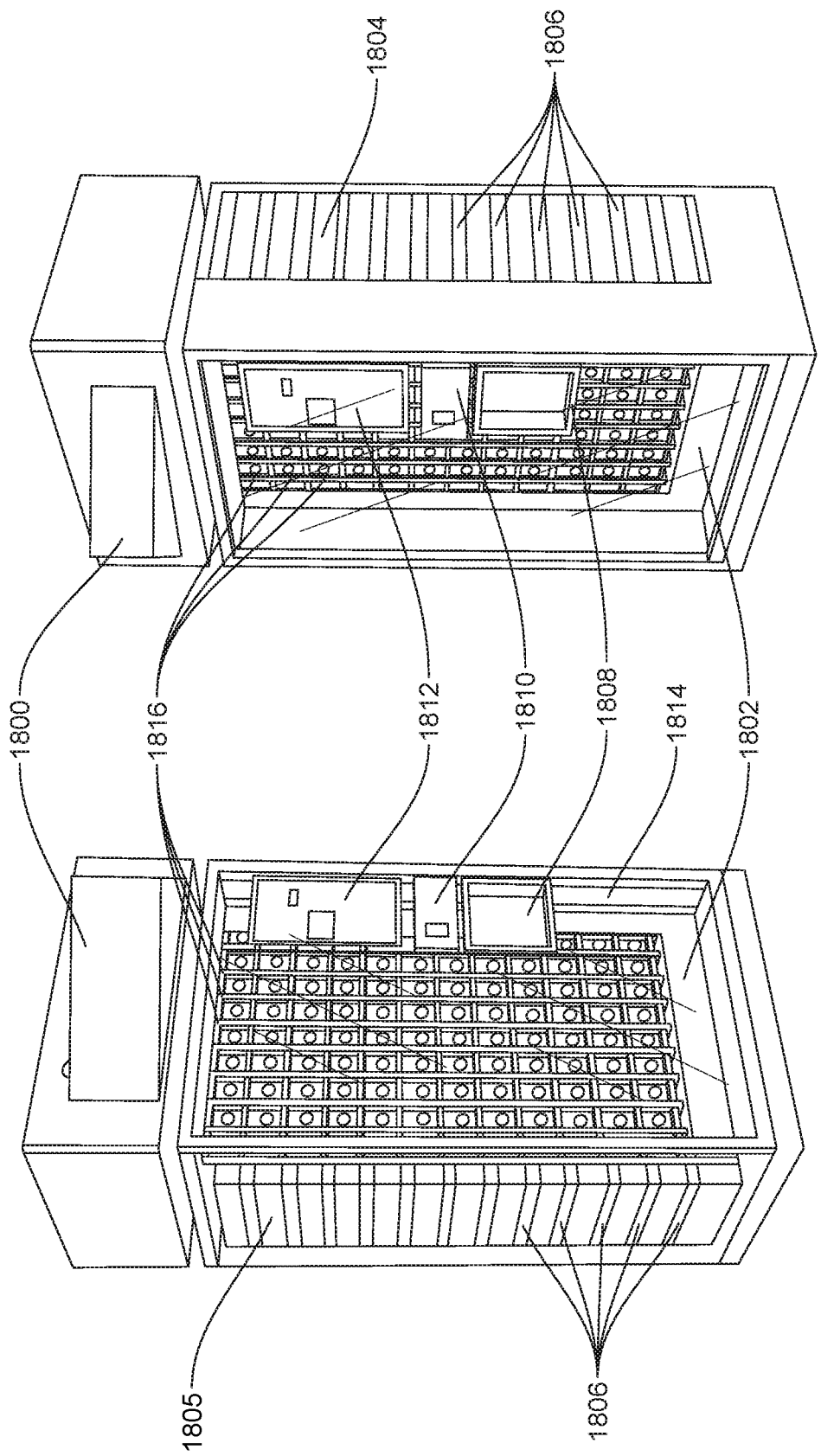

US 10,803,434 B2

AUTOMATED STORE TECHNOLOGIES

CROSS-REFERENCE TO RELATED CASES

The present application claims priority to U.S. Provisional Patent Application No. 62/724,465, entitled "AUTOMATED STORE TECHNOLOGIES," filed on Aug. 29, 2018, which is hereby incorporated by reference.

TECHNICAL FIELD

The present subject matter relates to the field of vending machines and more particularly to automated stores.

BACKGROUND

More recently vending machines have become more sophisticated and are being used to sell higher value products such as electronics, cosmetics, and other higher value consumer items. In retail applications it has been desirable to have a design of a machine that displays the products available for sale to consumers. The most popular recent designs allow products to be assorted on shelves in merchandise displays akin to retail shelves. In such designs, consumers can see the products available to be dispensed and can select them via a user interface for immediate delivery. Still, these designs are typically stand-alone units that must be physically visited by a consumer to make a purchase. And these designs must be visually inspected to determine whether they need to be replenished and whether they need to be serviced. The need for such visits by both the consumer and service personnel is inefficient-a consumer might not wish to purchase the products that are available in the vending machine and service personal would prefer to visit the vending machine only when it actually needs service or replenishing.

It is therefore desirable to have an automated store that is equipped to be remotely monitored and operated, both by remote staff and by customers.

BRIEF DESCRIPTION OF THE DRAWINGS

The embodiments are illustrated by way of example and not limitation in the figures of the accompanying drawings, in which like references indicate similar elements, and in which:

FIG. 6A is a photograph depicting the placement of a camera on an embodiment of an automated store;

FIG. 6B is a photograph further depicting the placement of a camera on an automated store of FIG. 6A;

FIG. 6C is front view depicting the placement of a camera on an embodiment of an automated store;

FIG. 9 depicts a screenshot from an embodiment of a system for remotely managing an automated store;

FIGS. 14A, 14B, and 14C are individual sections of a single is a screenshot from an embodiment of a system for monitoring automated store traffic and user behavior;

FIG. 18A is a perspective view of an embodiment of an automated store;

FIG. 18B is a perspective view of the embodiment of an automated store of FIG. 18A;

DETAILED DESCRIPTION

Figure 1:
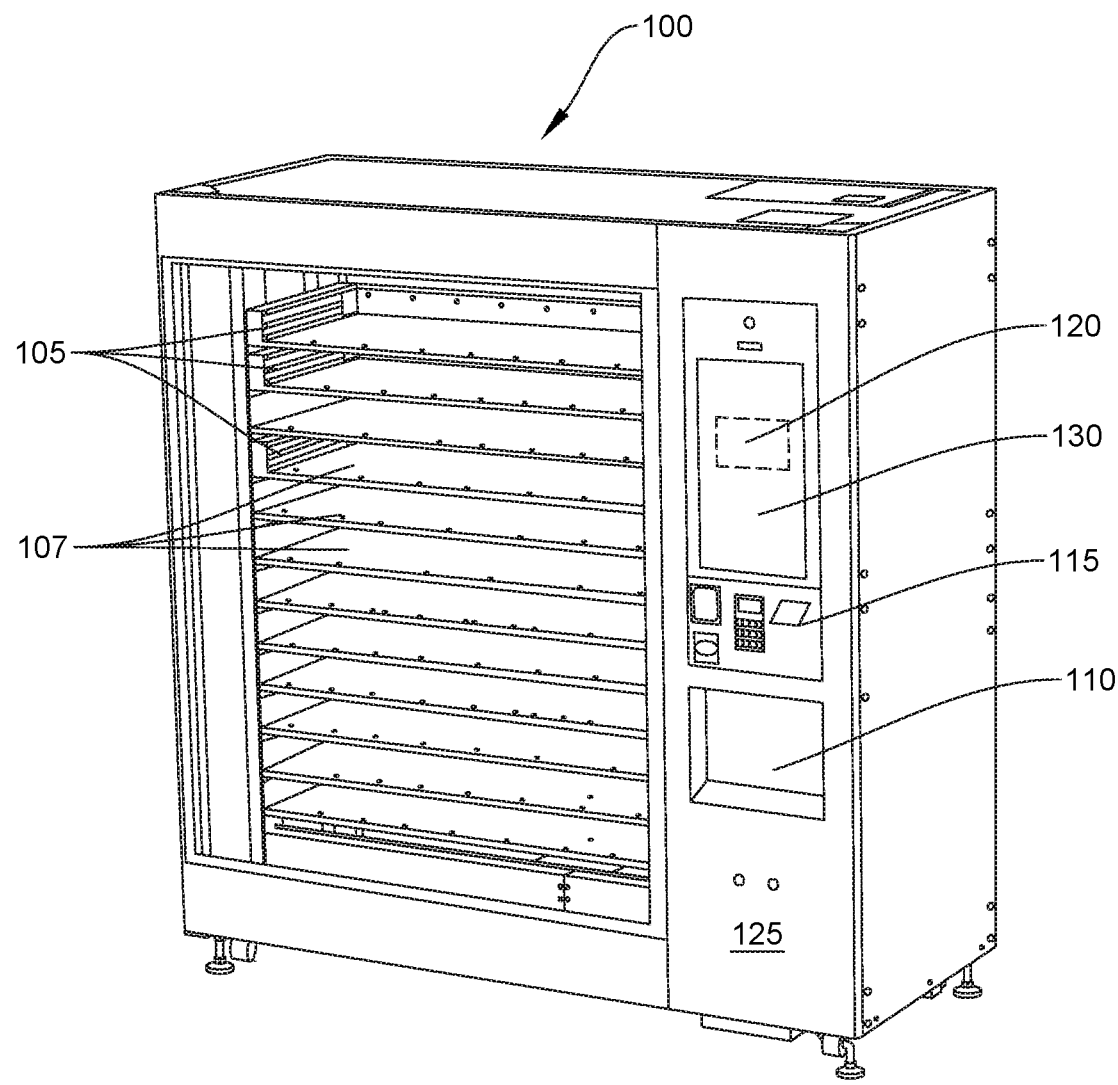
FIG. 1 is a perspective view of an embodiment of an automated store.

FIG. 1 is a perspective view depicting an embodiment of an automated store 100 (also known as a "vending machine"). In FIG. 1, automated store 100 includes an intelligent door 125 and dispensers 105 of shelved products (not shown) on shelves 107. Intelligent door 125 further includes a dispensing door 110, a user interface 115, a controller 120, and a display 130. Display 130 may display information regarding the available products. User interface 115 allows a user to choose and pay for products. Controller 120 may receive input from the user interface 115 and various sensors in the vending machine and controls the various systems of the vending machine. Products are stored on shelves 107 with different products on the same shelf being separated by a dispenser 105. Products are fed into a fetch and delivery bucket 302 (FIG. 3) when bucket 302 is moved into position under instruction from controller 120 and engages gears at the end of dispenser 105 that cause an extension on dispenser 105 to move forward, in turn causing product to be advanced by the extension until the product is pushed onto a platform of fetch and delivery bucket 302.

Bucket 302 is then moved to position behind dispensing door 110, delivering product to dispensing door 110. A user may access delivered products when dispensing door 110 is opened on instruction from controller 120. In an embodiment, controller 120 may also be connected to a network allowing controller 120 to be accessed via a network interface such as an application executed by a mobile communications device or a website accessed by a personal computer. In an embodiment, display 130 may also be used by the consumer to choose and pay for products.

Figure 2:
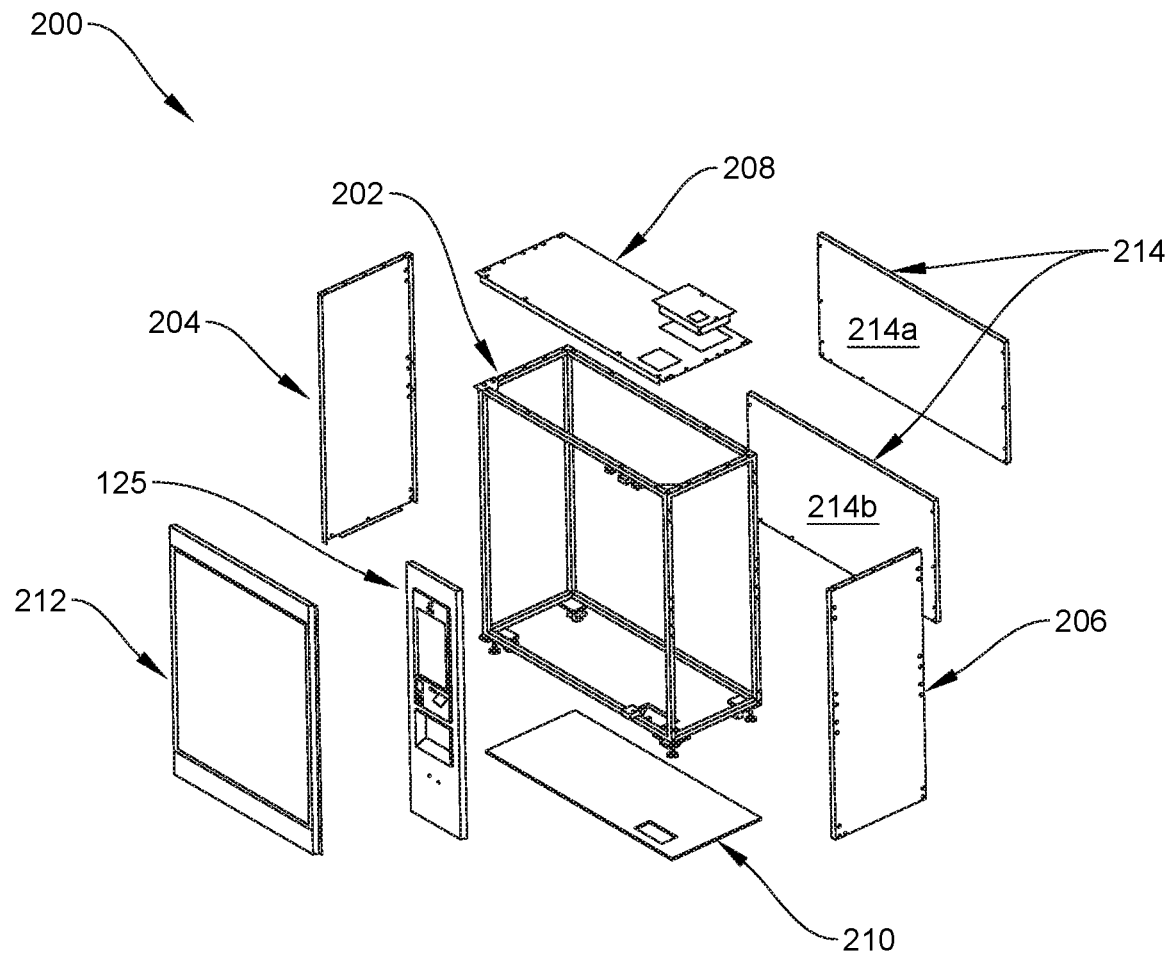
FIG. 2 is an expanded view of an embodiment of a cabinet subassembly for an automated store.

FIG. 2 is an expanded view of an embodiment of a cabinet subassembly 200 for automated store 100. In FIG. 2, cabinet subassembly 200 may include a tubular frame 202 to which intelligent door 125, product door 212, side panels 204, 206, a top panel 208, a bottom panel 210, a clear product door 212 and a back panel 214 (or back panels 214a, 214b) are attached to define an interior space. The interior space may be accessed by opening one or both of intelligent door 125 and product door 212, which may be attached by hinges to frame 202.

Figure 3:
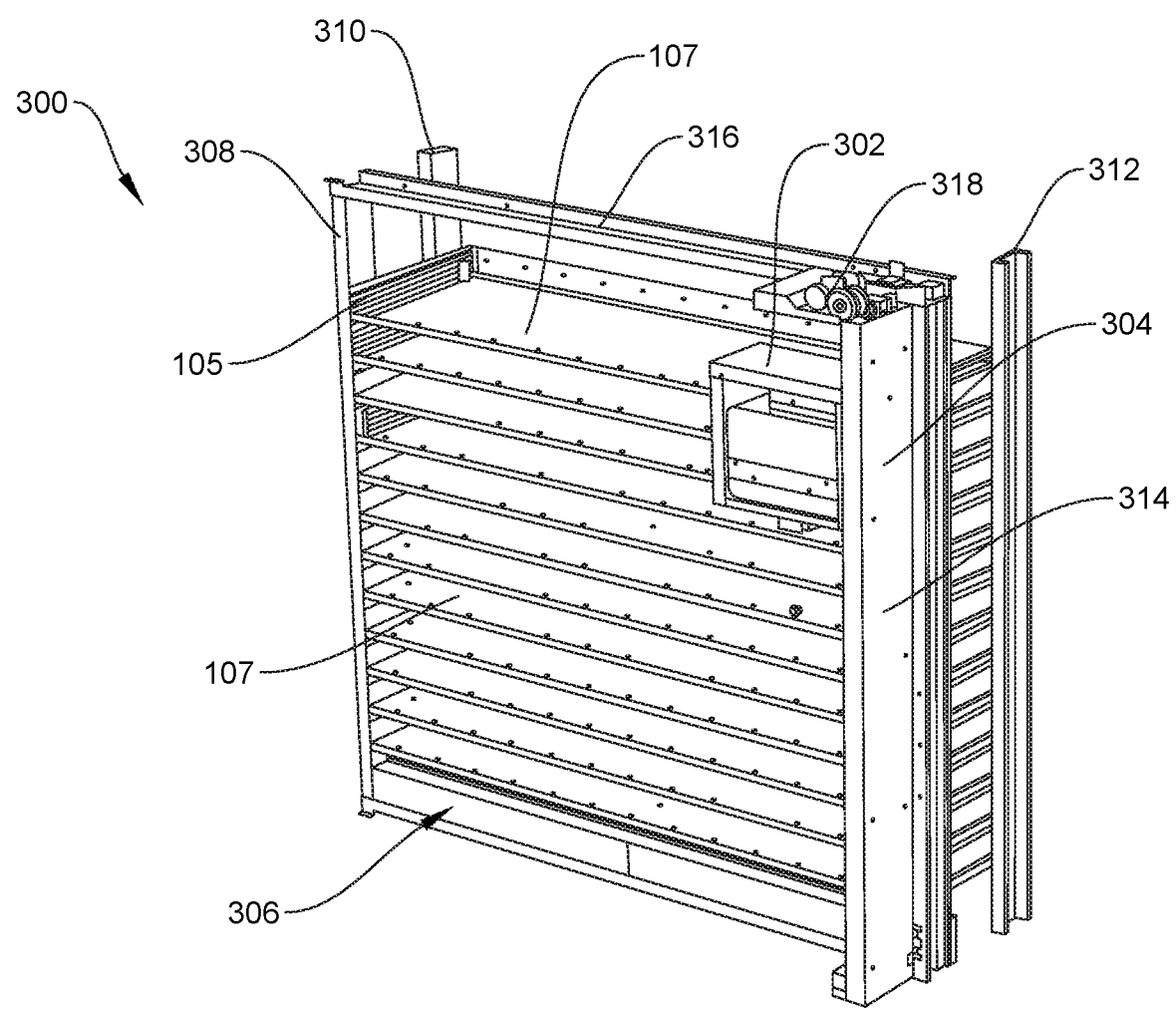
FIG. 3 is a perspective view of an embodiment of a subassembly for an automated store.

FIG. 3 is a perspective view of an embodiment of a subassembly of internal parts 300 for automated store 100. In FIG. 3, internal parts 300 includes fetch and delivery bucket 302 (or simply "bucket"), an X-Y positioning system 304, a peripheral box 306, and shelving end supports 308, 310, 312. X-Y positioning system 304 includes a Y-rail 314, an X-rail 316, an X-positioner mechanism 318, and a Y-positioner mechanism 606 (FIG. 6). X-Y positioning system 304 is connected to bucket 302 and, on instructions from controller 120, moves bucket 302 along X-rail 316 and Y-rail 314 to position bucket 302 at product locations, where bucket 302 is able to engage a dispenser 105 and cause dispenser 105 to move a product onto a platform of bucket 302. Once product is loaded into bucket 302, X-Y positioning system 304 then moves bucket 302 to an area behind dispensing door 110. In an embodiment, peripheral box 306 may house a personal computer (PC), which may be controller 120, a modem or other network connection, internal switches (e.g., for controlling X-Y positioning system 304, bucket 302, and dispensing door 110, and electronic locks), and power supplies.

Figure 4:
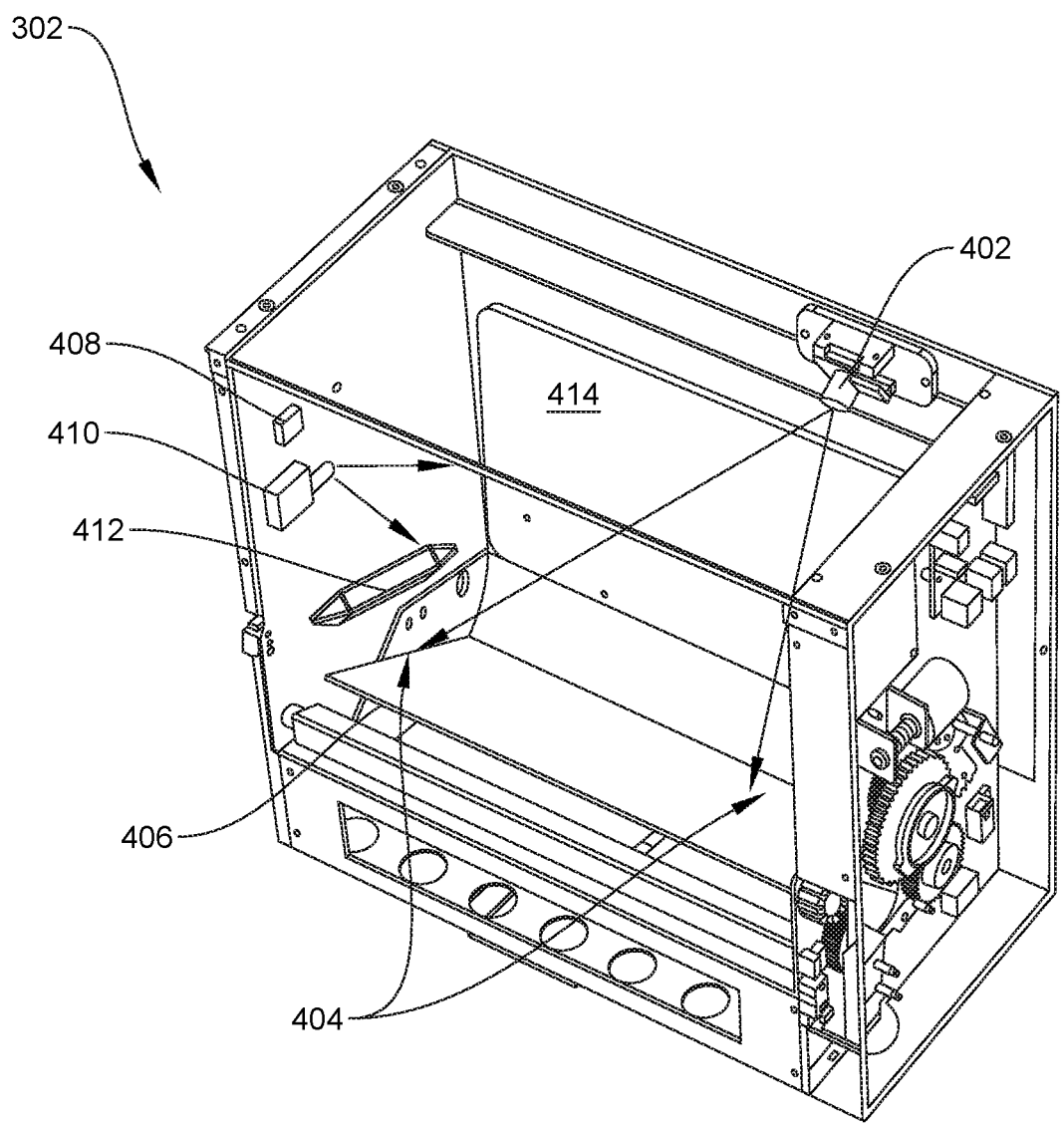
FIG. 4 is a perspective view of an embodiment of a fetch and delivery bucket for an automated store.

FIG. 4 is a perspective view of an embodiment of fetch and delivery bucket 302 for automated store 100. In FIG. 4, bucket 302 is shown primarily from the point of view of a product on a shelf. Bucket 302 may include an inwardly-facing camera 402, an outwardly-facing camera 410, a flap 406, a bucket door 414, and infrared (IR) sensor 408, and radio frequency identification (RFID) scanner 412. Inwardly-facing camera 402 captures a field of view 404 that includes much or all of the interior of bucket 302, including flap 406, and also including product(s), dispenser(s), and shelves. Outwardly-facing camera 410 captures a field of view that includes much or all of flap 406, bucket door 414, and, when bucket door is opened, dispensing door 110, and when dispensing door 110 is opened, the area in front of dispensing door 110. Flap 406 has a lowered position in which it is a platform for receiving product from a dispenser 105 and a raised position causing product to slide forward toward the dispensing side of bucket 302. Flap 406 may be moved between the two positions by DC motors on instruction from controller 120. Bucket door 414 in the vertical position shown helps retain product within bucket 302. When bucket 302 is positioned in the dispensing area and both bucket door 414 and dispensing door 110 are opened, a customer may remove product from bucket 302. IR sensor 408 may be interfaced with controller 120 and used to determine the presence of product within bucket 302. RFID scanner 412 may be interfaced with controller 120 and used to determine both the presence and identity of product within bucket 302. In embodiments, the images from cameras 402, 410 may be still images, video images, or both.

Thus, in the embodiment of FIG. 4, images from camera 402 may be analyzed to determine the position of bucket 302, and elements of bucket 302, with respect to a particular dispenser 105 and a particular product at that dispenser. In an embodiment, the images may be analyzed by controller 120 in real-time to determine whether bucket 302 is properly aligned with a dispenser 105, or shelf 107, or product. In response to controller 120 determining that bucket 302 is improperly aligned, controller 120 may instruct X-Y positioning system 302 to make adjustments to correct the mis-alignment of bucket 302.

In an embodiment, camera 402 may record and store images from multiple transfers of product from a particular dispenser 105 (such transfers may be considered a "dispense" or a "dispense cycle"). The images may be stored on a database accessible via a network. The stored images may be stored such that images related to failures of the transfer are identified and made available so that Artificial Intelligence (AI) methods, such as machine learning, may be applied to the stored images to develop instructions for improving the transfer of product. For example, the AI methods may review the transfers from a particular dispenser or all dispensers to the flap 406 (or platform) of bucket 302. In an embodiment, the developed instructions (from a particular dispenser, or a number of dispensers) are applied by controller 120 when controlling the transfer from the particular dispenser 105. In an embodiment, the developed instructions are applied by controller 120 when controlling the transfer from the particular dispenser 105 of a particular product. In an embodiment, the instructions developed for a particular dispenser may be applied by controller 120 to control the transfer from a different dispenser. In an embodiment, the instruction developed regard a particular product instead of a particular dispenser and the developed instructions are applied by controller 120 when controlling the transfer of the particular product, regardless of the dispenser. Thus, generally, AI methods may be used to develop instructions for improving the transfer of one or more different products from one or more dispensers onto the platform of bucket 302.

Similarly to camera 402, the images from camera 410 may be analyzed to determine the position of bucket 302, and elements of bucket 302, with respect to a particular dispensing door 110. In an embodiment, the images may be analyzed by controller 120 to determine whether bucket 302 is properly aligned with a dispensing door 110.

In an embodiment, camera 410 may record and store images from multiple transfers of products from bucket 302 through dispensing door 110. The images may be stored on a database accessible via a network. Artificial Intelligence (AI) methods, such as machine learning, may be applied to the stored images to develop instructions for improving the transfer of products from bucket 302 through dispensing door 110. In an embodiment, the developed instructions are applied by controller 120 when controlling the transfer from bucket 302. In an embodiment, the developed instructions are applied by controller 120 when controlling the transfer of a particular product. In an embodiment, the instructions developed for a particular product may be applied by controller 120 to control the transfer of a different product. Thus, generally, AI methods may be used to develop instructions for improving the transfer of one or more different products from bucket 302 through dispensing door 110.

In an embodiment, the images stored by camera 402, camera 410, or both, may be consulted by remote staff regarding a particular transfer of a product to a particular customer. The remote staff may consult the images to, e.g., determine or verify that the customer received a product, or that the customer received the proper product.

In an embodiment, bucket door 414 opens by rotating forward from its base, draw-bridge style, through an open dispensing door 110. With the forward rotation of bucket door 414, flap 406 rotates further up until it is or approaches the vertical, which accomplishes two goals: first, product is urged forward and made more accessible by the customer, and second, flap 406 is positioned vertically, which prevents access into the interior of the automated store, hindering the unauthorized removal of products.

In an embodiment, RFID scanner 412 may determine the identity of a product on the shelf position nearest bucket 302. Thus, in the embodiment, RFID scanner 412 may be used to confirm the identity of the product before it is loaded onto bucket 302.

Figure 5:
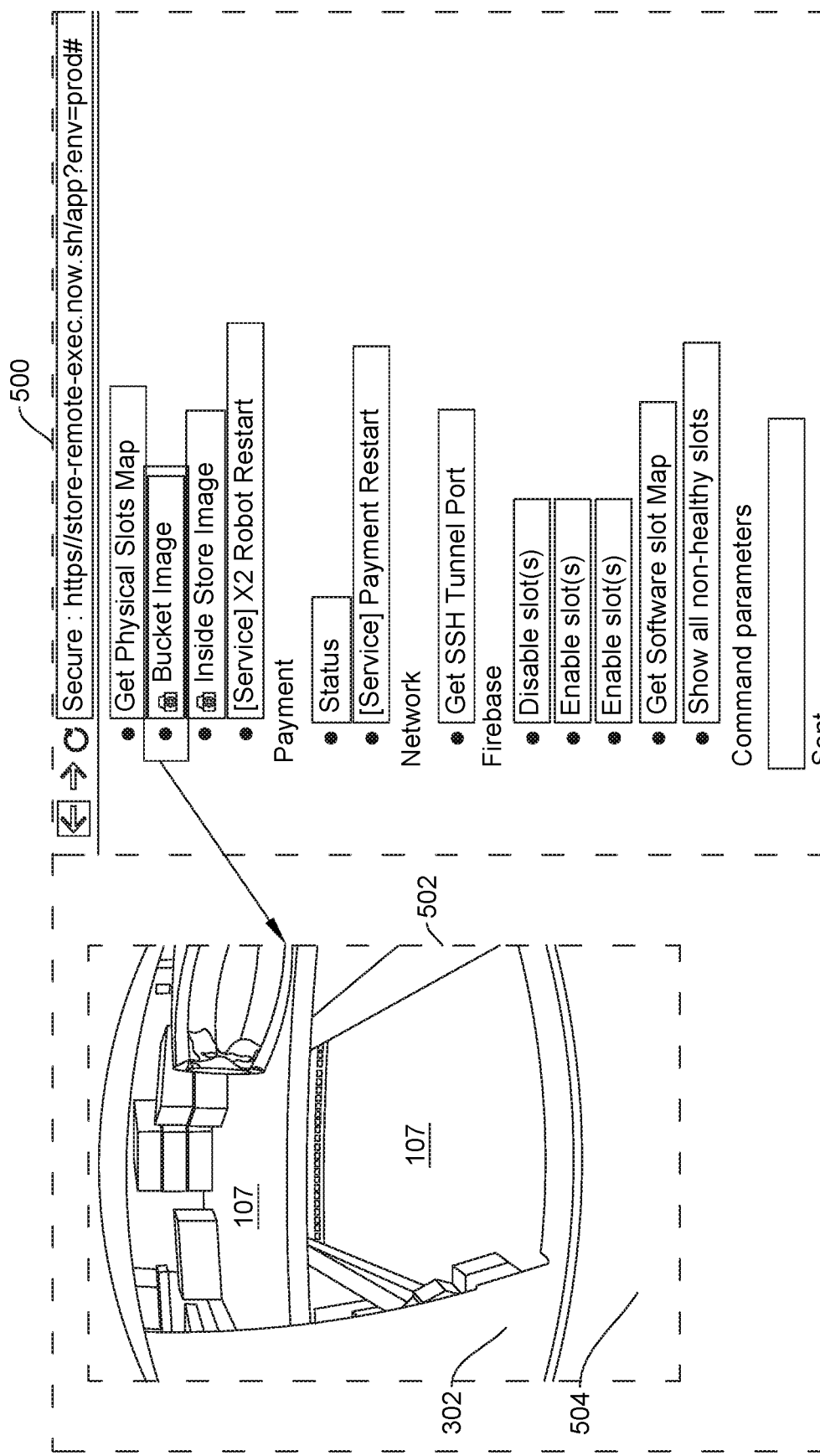
FIG. 5 is a photograph of an internal section of an automated store from a camera on an embodiment of a fetch and delivery bucket for an automated store and an associated screenshot from an embodiment of a system for remotely managing an automated store.

FIG. 5 illustrates a screenshot 500 from an embodiment of a system for remotely managing automated store 100 and an associated image 502 of an internal section of automated store 100 from camera 402 on fetch and delivery bucket 302. In FIG. 5, screenshot 500 is from a monitoring program, which may include a networked user interface accessible from, e.g., a website or from an application executing on a device, such as a mobile communications device, with access to controller 120 through a network (e.g., network 1935 (FIG. 19)). The user interface allows remote staff, for example, to perform the listed operations remotely. In FIG. 5, the listed operations are shown grouped according to types: payment, network, and firebase. The listed operations are exemplary and are not exhaustive. In FIG. 5, the user has selected "Bucket Image," which opens a window with an image 502 from inwardly-facing camera 402. Image 502 shows two shelves 107, part of the back face of bucket 302 and a section 504 of the interior of bucket 302. Image 502 shows that the upper shelf 107 contains products and that the lower shelf 107 is empty (the details to the left side of lower shelf 107 depict a dispenser and apparatus associated with the dispenser). Section 504 of the interior of bucket 302 may include flap 406. Thus, using the system and networked user interface, remote staff may perform operations such as retrieving a "bucket image," which allows inspecting the interior of remote store 100 using camera 402.

FIG. 6A, FIG. 6B, and FIG. 6C illustrate the placement of an interior camera 602 within an embodiment of automated store 100. In FIG. 6A, camera 602 is attached within automated store 100 at the corner of the intersection of top panel 208 and side panel 204. Camera 602 is shown with wiring linking it to networked controller 120 and a networked database. Thus, images taken by camera 602 may be stored in the external database, as with images from cameras 402 and 410. Camera 602 is situated in front of shelving end support 308 and between shelving end support 308 and product door 212 (not shown). FIG. 6B illustrates that the placement of camera 602 between shelves 107 and product 212 (not shown) allows camera 602 to capture a field of view that includes the front faces of shelves 107. In FIG. 6C, camera 602 is shown to capture a field of view 604 that ranges from the far upper right corner and near lower left corner of automated store 100. FIG. 6C further illustrates that X-Y positioner system 304 includes a Y-positioner mechanism 606 that positions bucket 302 vertically on Y-rail 314. Controller 120 instructs both X-positioner mechanism 318 and Y-positioner mechanism 606 to position bucket 302.

In the embodiment, the field of view provided by camera 602 allows images to be taken of the movement and loading of bucket 302. Such images may be analyzed, like images from cameras 402 and 410, by controller 120 to direct the proper positioning of bucket 302. Such images may also be analyzed, like images from cameras 402 and 410, by AI methods to develop instructions for controller 120 that improve the transfer of product from shelves 107 into bucket 302, or from bucket 302 through dispensing door 110. In an embodiment, images from the three cameras 402, 410, and 602 may be collectively analyzed by AI methods to develop instructions for controller 120 that improve the transfer of product from shelves 107 into bucket 302, or from bucket 302 through dispensing door 110.

In an embodiment, automated store 100 may intelligently track which products cause which errors during a dispense cycle and also which vend positions work better for vending those products. Automated store 100 may collect data from its cameras and other sensor and using, e.g. machine learning or other AI methods, get smarter about vending products over time without any human interaction.

In an embodiment, one or more of cameras 402, 410, and 602 may be wirelessly networked with controller 120 and the networked database.

Figure 7:
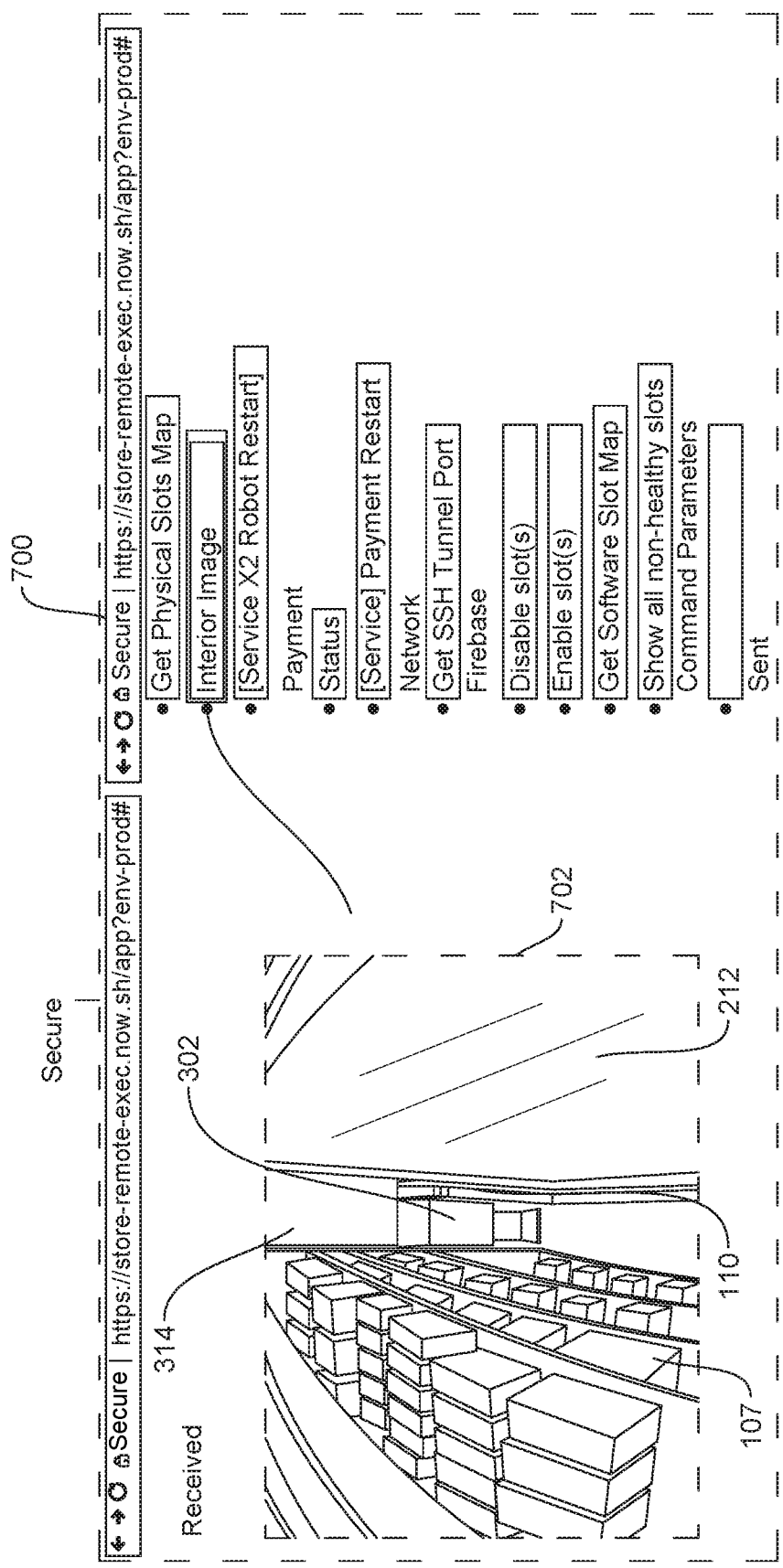
FIG. 7 is a photograph of an internal section of an automated store from a camera on an embodiment of an automated store and an associated screenshot from an embodiment of a system for remotely managing an automated store.

FIG. 7 is a photograph of an internal section of automated store 100 from a camera on an embodiment of automated store 100 and an associated screenshot from an embodiment of a system for remotely managing automated store 100;

FIG. 7 illustrates a screenshot 700 from an embodiment of a system for remotely managing automated store 100 and an associated image 702 of an internal section of automated store 100 from interior camera 602 within an embodiment of automated store 100. In FIG. 7, screenshot 700 is from the monitoring program described with regard to FIG. 5. In FIG. 7, the user has selected "Interior Image," which opens a window with an image 702 from interior camera 602. Image 702 illustrates shelves filled with product (the dispensers are omitted). Image 702 also illustrates bucket 302 between the shelves and front panel 212, and positioned behind dispensing door 110. Thus, using the system and networked user interface, remote staff may perform operations such as retrieving an "interior image," which allows inspecting the interior of remote store 100 using camera 402. In embodiments, the images from camera 602 may be still images, video images, or both. In an embodiment, the images stored by camera 602 may be consulted by remote staff regarding a particular transfer of a product to a particular customer. The remote staff may consult the images to, e.g., determine or verify that the customer received a product, or that the customer received the proper product. In an embodiment, camera 602 may be instructed to obtain images during the provisioning or other service of automated store 100. These images may then be consulted by remote staff to, e.g., determine or verify that automated store 100 was properly provisioned.

Figure 8B:
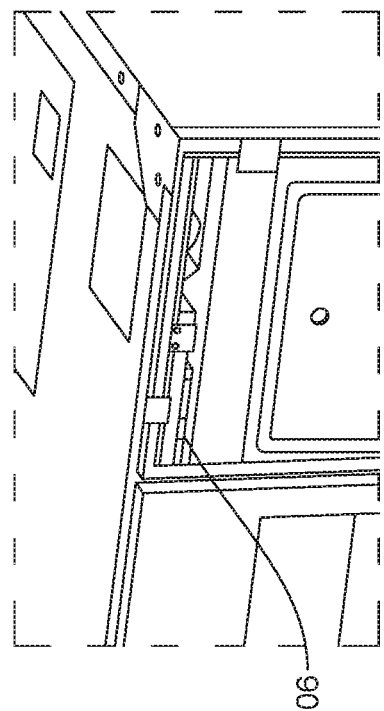
FIG. 8B is a perspective view of a detail of the embodiment of an automated store of FIG. 8A.
Figure 8C:
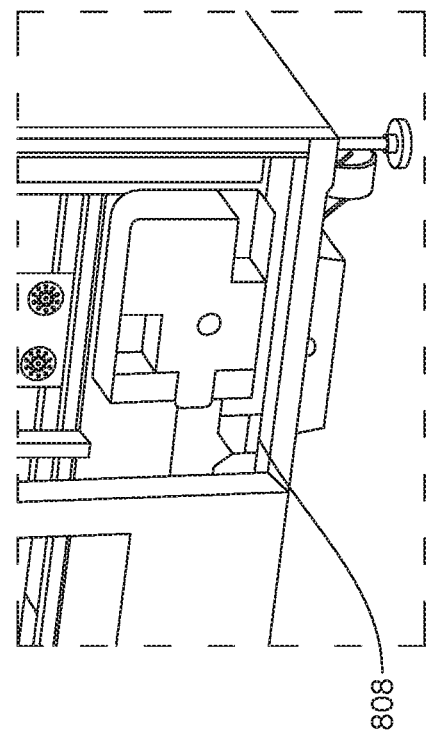
FIG. 8C is a perspective view of a detail of the embodiment of an automated store of FIG. 8A.
Figure 8A:
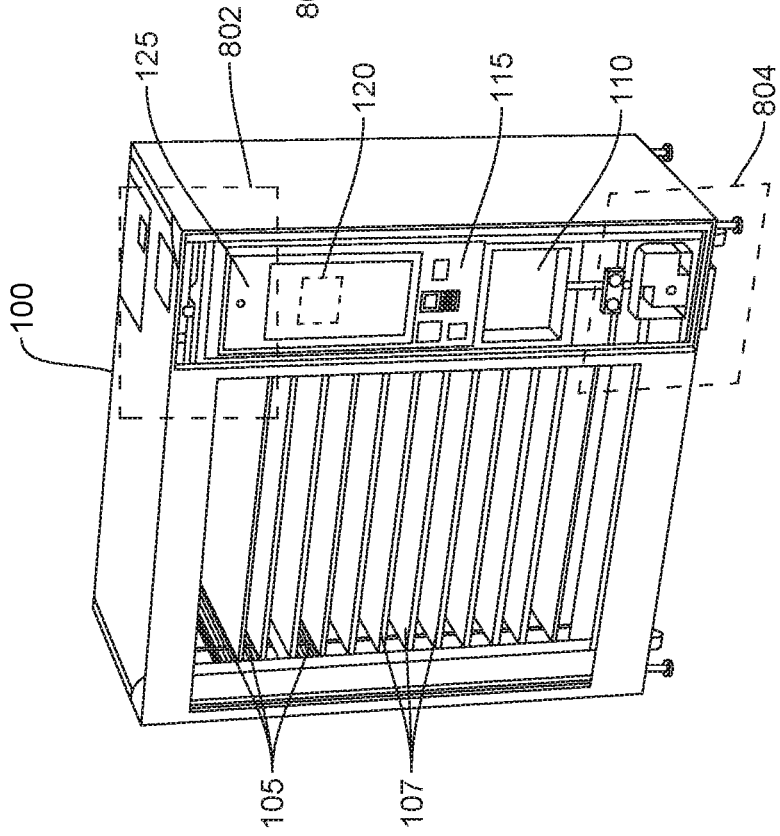
FIG. 8A is a perspective view of an embodiment of an automated store.

FIG. 8A is a perspective view of an embodiment of automated store 100. Intelligent door 125 pivots open upon hinges attaching it to the corner of automated store 100. Front panel 212 pivots open upon hinges attaching it to the opposing front corner of automated store 100. In FIG. 8a upper section 802 and lower section 804 of intelligent door 125 have been rendered partially transparent to show aspects of the inner apparatus. FIG. 8B further illustrates details of section 802 and FIG. 8C further illustrates details of section 804. In FIG. 8B, an electronic lock 806 engages automated store 100, retaining both intelligent door 125 and front panel 212 in the closed position. Similarly, in FIG. 8C, an electronic lock 808 engages automated store 100, retaining both intelligent door 125 and front panel 212 in the closed position. Electronic locks 806, 808 may be networked such that they are in communication with controller 125 and may be actuated via the monitoring program.

FIG. 9 illustrates a screenshot 900 from an embodiment of a system for remotely managing automated store 100. In FIG. 9, screenshot 900 is from the monitoring program described with regard to FIG. 5. Screenshot 900 illustrates that remote staff may choose to monitor automated stores at various locations, e.g., South Station Bus Terminal 902, and LGA-Term B-Conc A 904.

Figure 10:
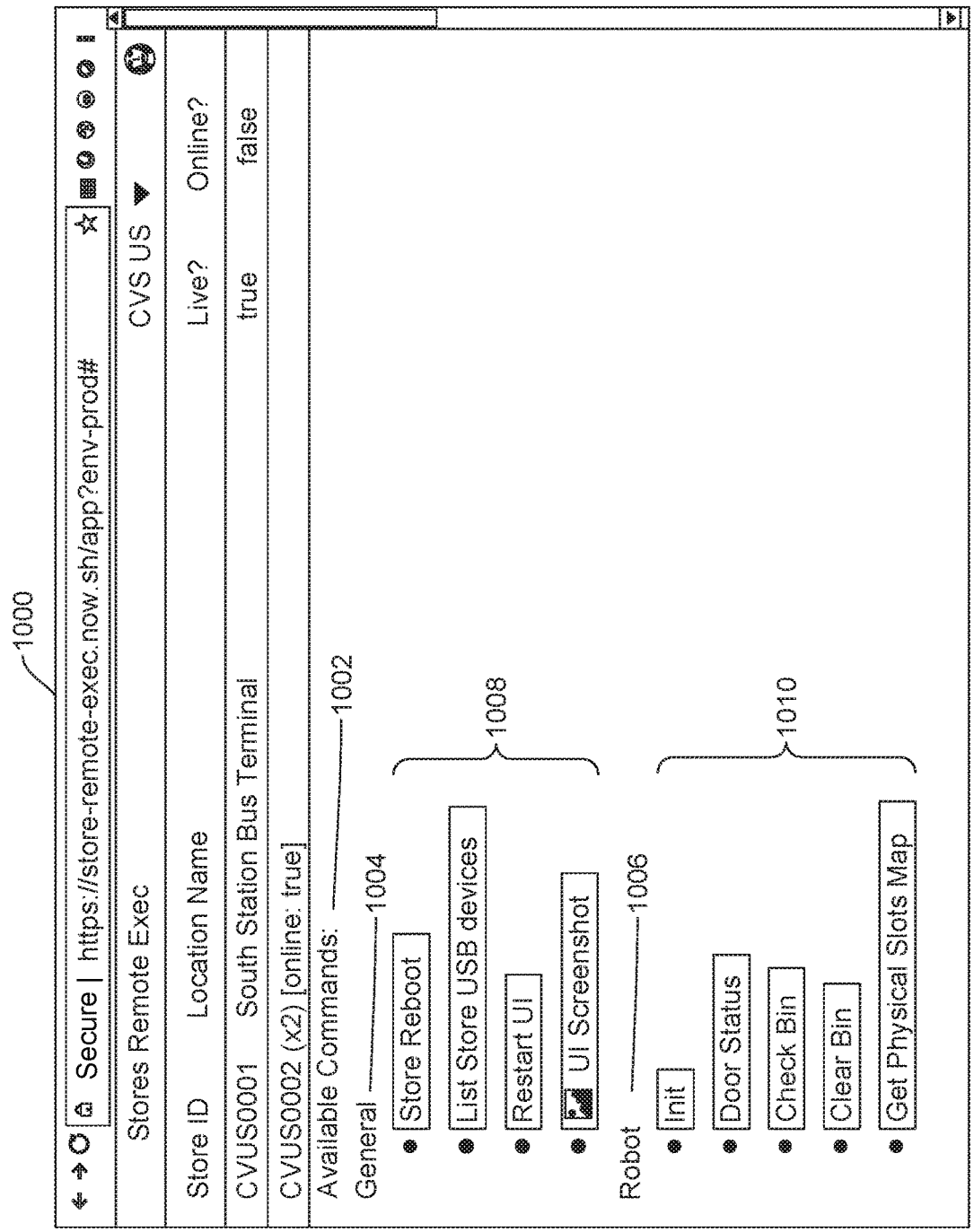
FIG. 10 depicts a screenshot from an embodiment of a system for remotely managing an automated store.

FIG. 10 illustrates a screenshot 1000 from an embodiment of a system for remotely managing automated store 100. In FIG. 10, screenshot 1000 is from the monitoring program described with regard to FIG. 5. Screenshot 1000 illustrates that remote staff may choose from a number of available commands 1002, which are segregated by types, including: general commands 1004 and robot commands 1006, where general commands 1004 include commands 1008 and robot commands include commands 1010.

Figure 11:
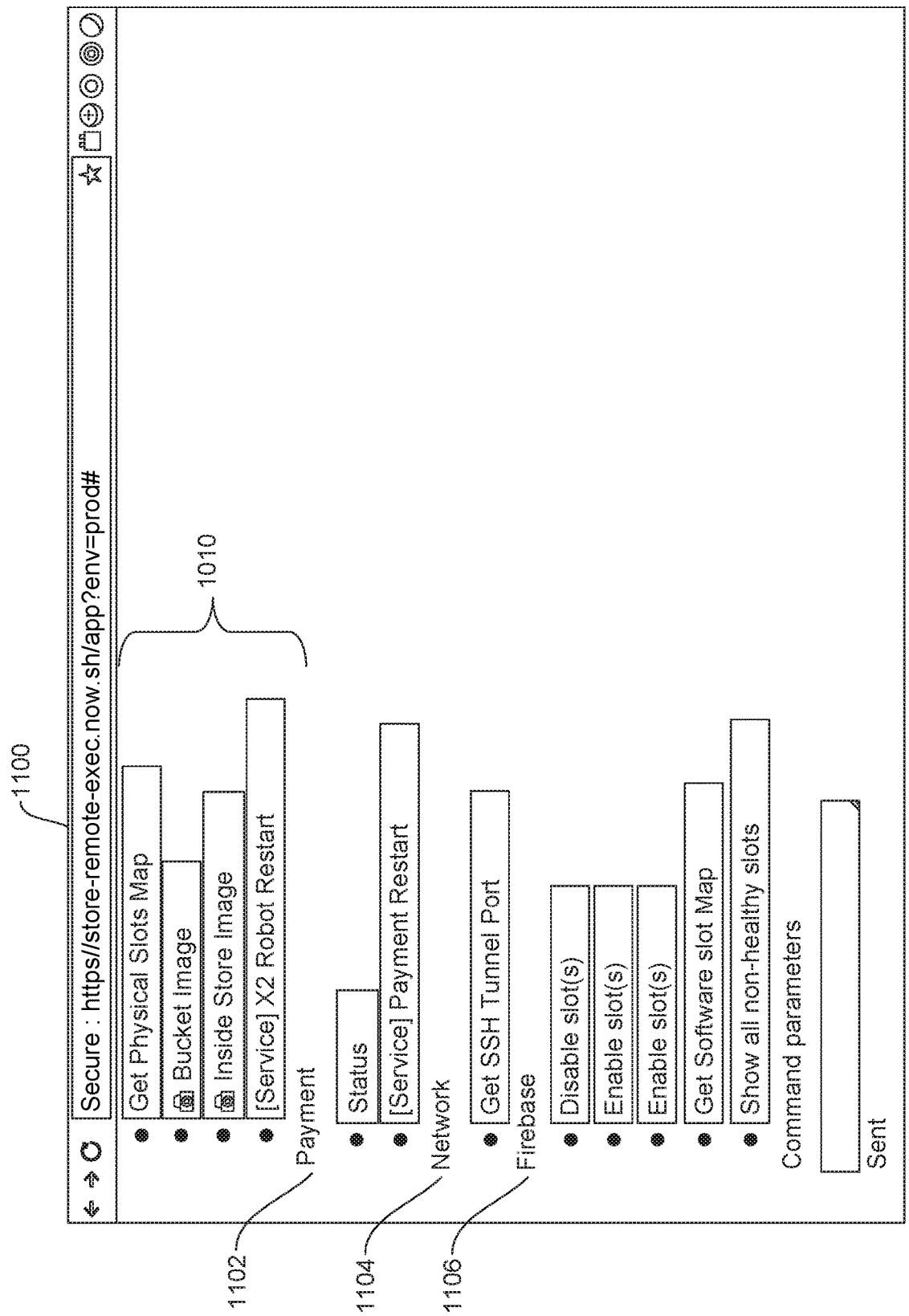
FIG. 11 depicts a screenshot from an embodiment of a system for remotely managing an automated store.

FIG. 11 illustrates a screenshot 1100 from an embodiment of a system for remotely managing automated store 100. In FIG. 11, screenshot 1100 is from the monitoring program described with regard to FIG. 5. Screenshot 1100 illustrates a payment command group 1102, a network command group 1104, and a firebase command group 1106.

Figure 12:
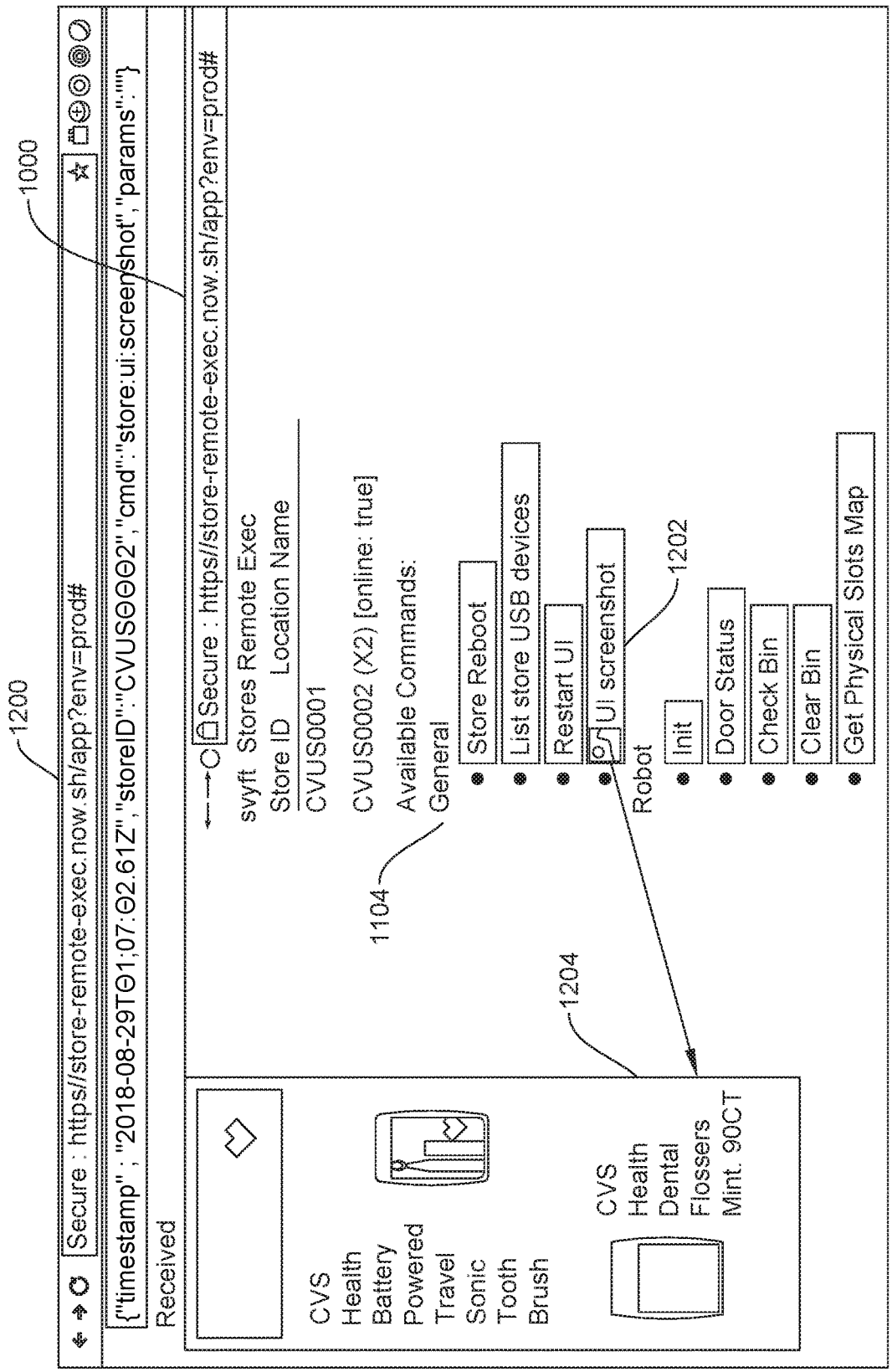
FIG. 12 depicts a screenshot from a user interface of a system for remotely managing an automated store.

FIG. 10 illustrates a screenshot 1000 from an embodiment of a system for remotely managing automated store 100. In FIG. 10, screenshot 1000 is from the monitoring program described with regard to FIG. 5. Screenshot 1000 illustrates that remote staff may FIG. 12 illustrates a screenshot 1200 from an embodiment of a system for remotely managing automated store 100 and an associated image 1204 of display screen 130. FIG. 12 illustrates that remote staff may select a general command 1104 called a "UI screenshot" 1202 to view display 130 in real time, where "UI screenshot" refers to an embodiment in which display 130 is a user interface. Thus, remote staff may be able to review a customer interaction with the automated store. The embodiment allows remote staff to determine whether display 130 is providing information that corresponds accurately to the products contained within the automated store (and verified, e.g., using cameras 402, 410, or 602).

Figure 13B:
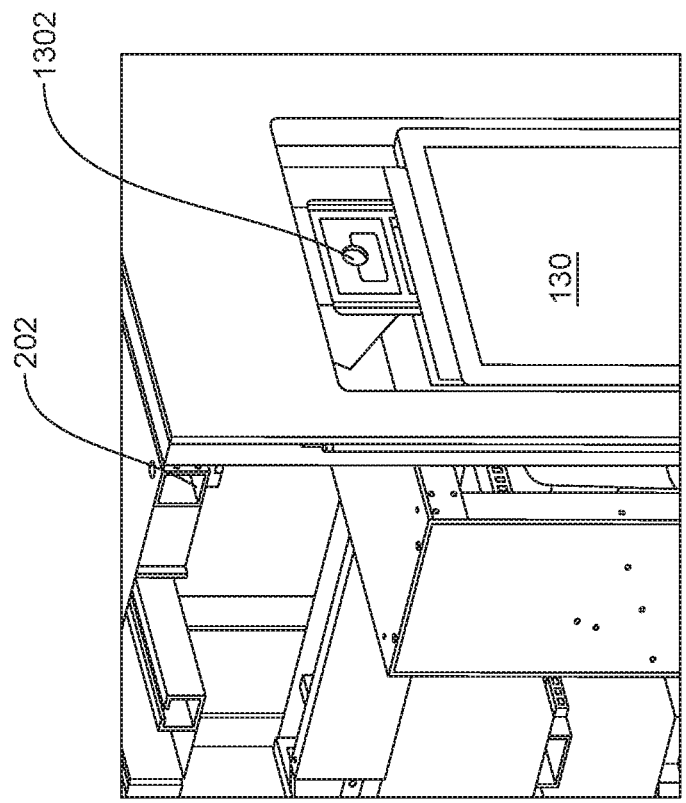
FIG. 13B is a perspective view of a detail of the embodiment of an automated store of FIG. 13A.
Figure 13A:
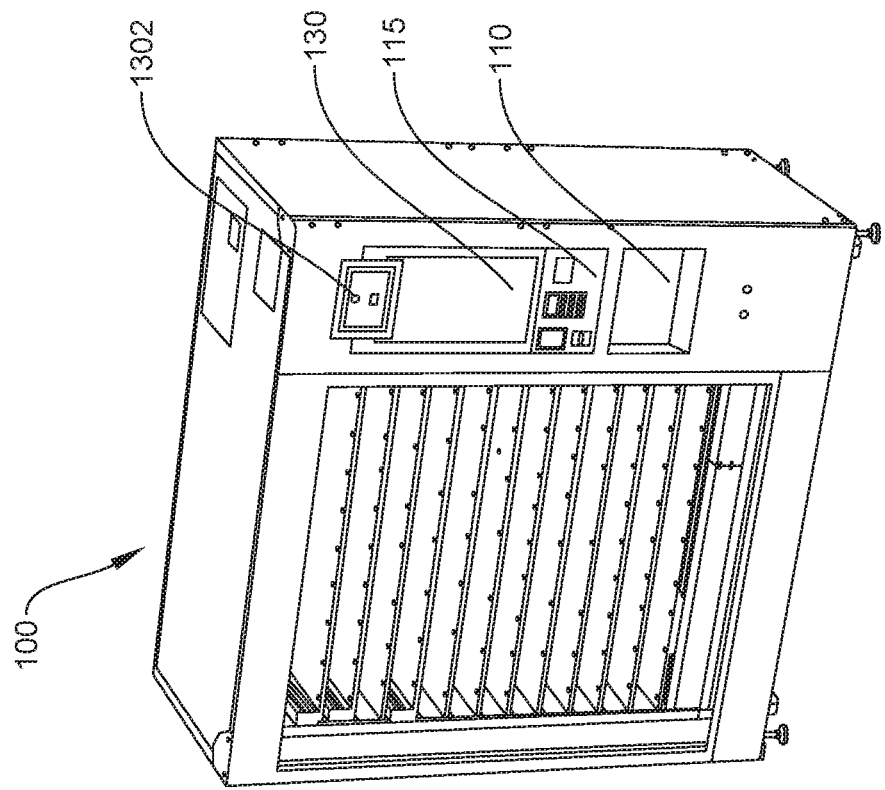
FIG. 13A is a perspective view of an embodiment of an automated store.

FIG. 13A is a perspective view of an embodiment of an automated store 100 incorporating a traffic monitoring camera 1302. In FIG. 13A, traffic monitoring camera 1302 is located on the front of automated store 100 in intelligent door 125 above display 130. Traffic monitoring camera 1302 captures a field of view that includes a customer interacting with automated store 100 and potential customers ("foot traffic") passing in front of automated store 100.

FIG. 13B is a perspective view of the embodiment of FIG. 13A with the section about camera 1302 on intelligent door 125 rendered partially transparent to reveal further details of the location and orientation of camera 1302.

Figure 14A:
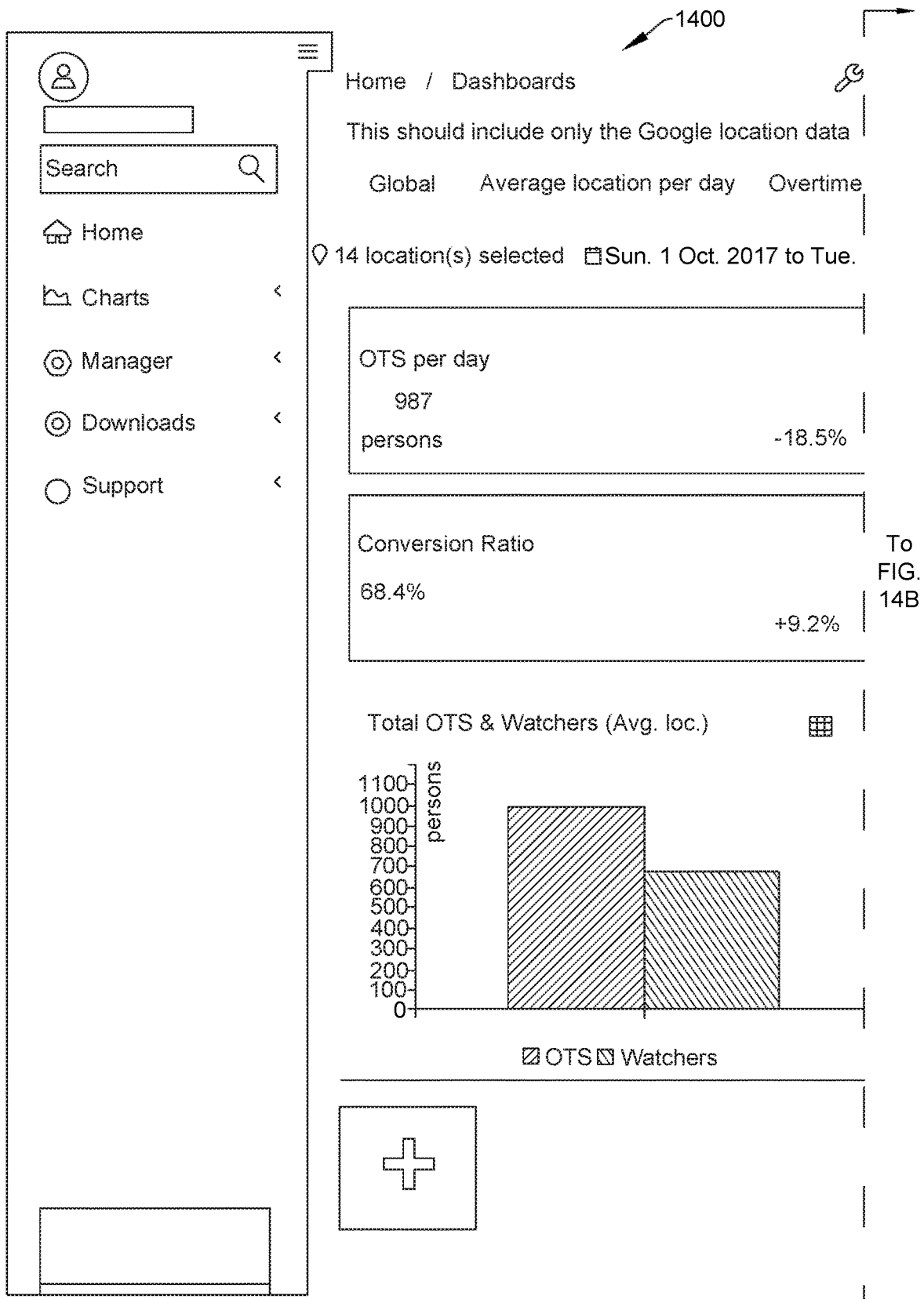
Figure 14B:
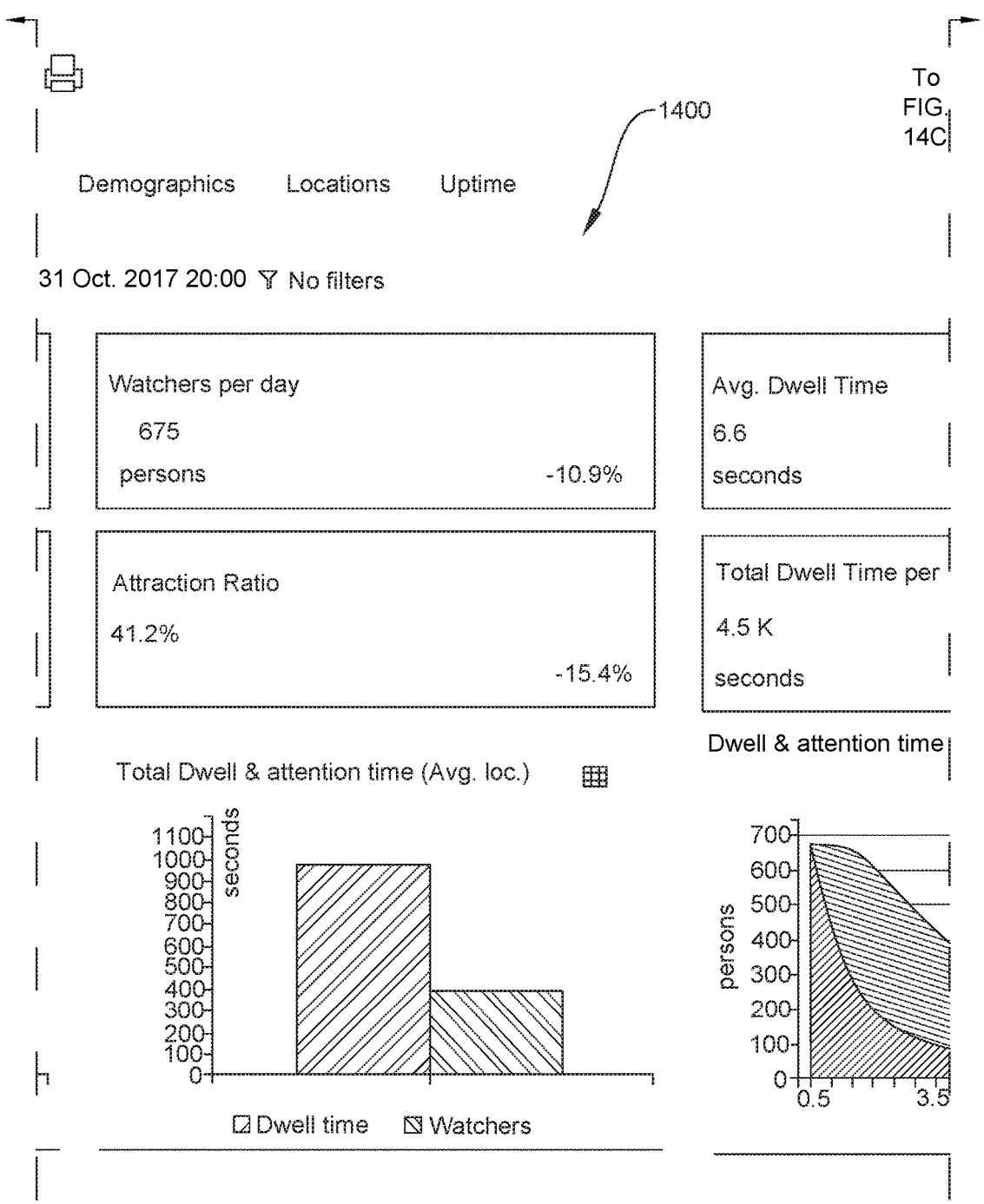

FIGS. 14A-14C, when combined as indicated in each figure, illustrate a single screenshot 1400 from an embodiment of a system for remotely managing automated store 100. In FIGS. 14A-14C, screenshot 1400 is from the monitoring program described with regard to FIG. 5. Screenshot 1400 illustrates that traffic monitoring camera 1302 may obtain and store images in the remote database. The images may be analyzed and processed by remote staff. The images may be analyzed and processed using AI methods, such as machine learning. The analysis may develop data regarding the customers and potential customers who pass by as foot traffic, such as average dwell time and conversion ratio. Such data may be displayed on the dashboard of screenshot 1400.

Figure 15A:
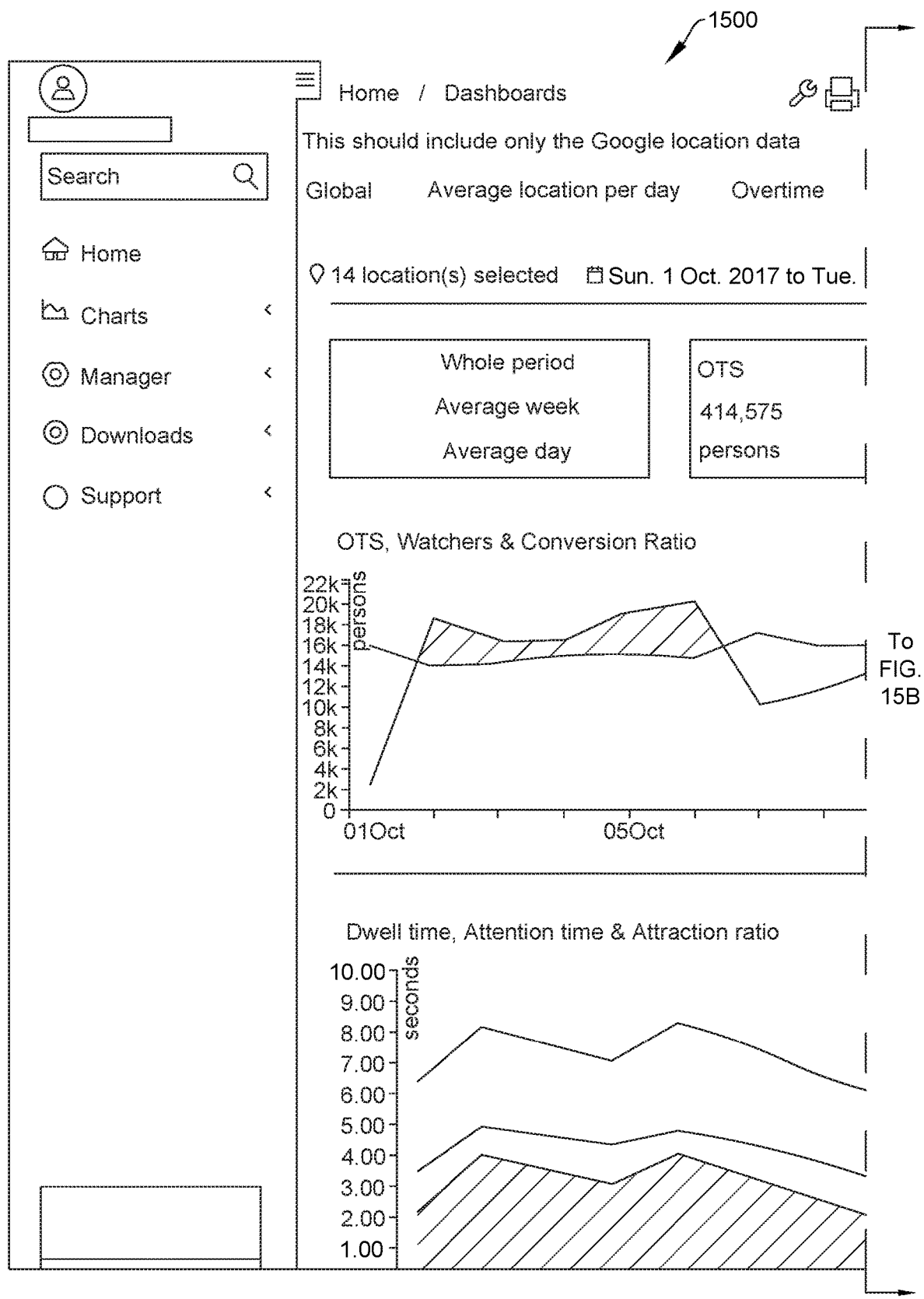
FIGS. 15A, 15B, and 15C are individual sections of a single is a screenshot from an embodiment of a system for monitoring automated store traffic and user behavior.
Figure 15B:
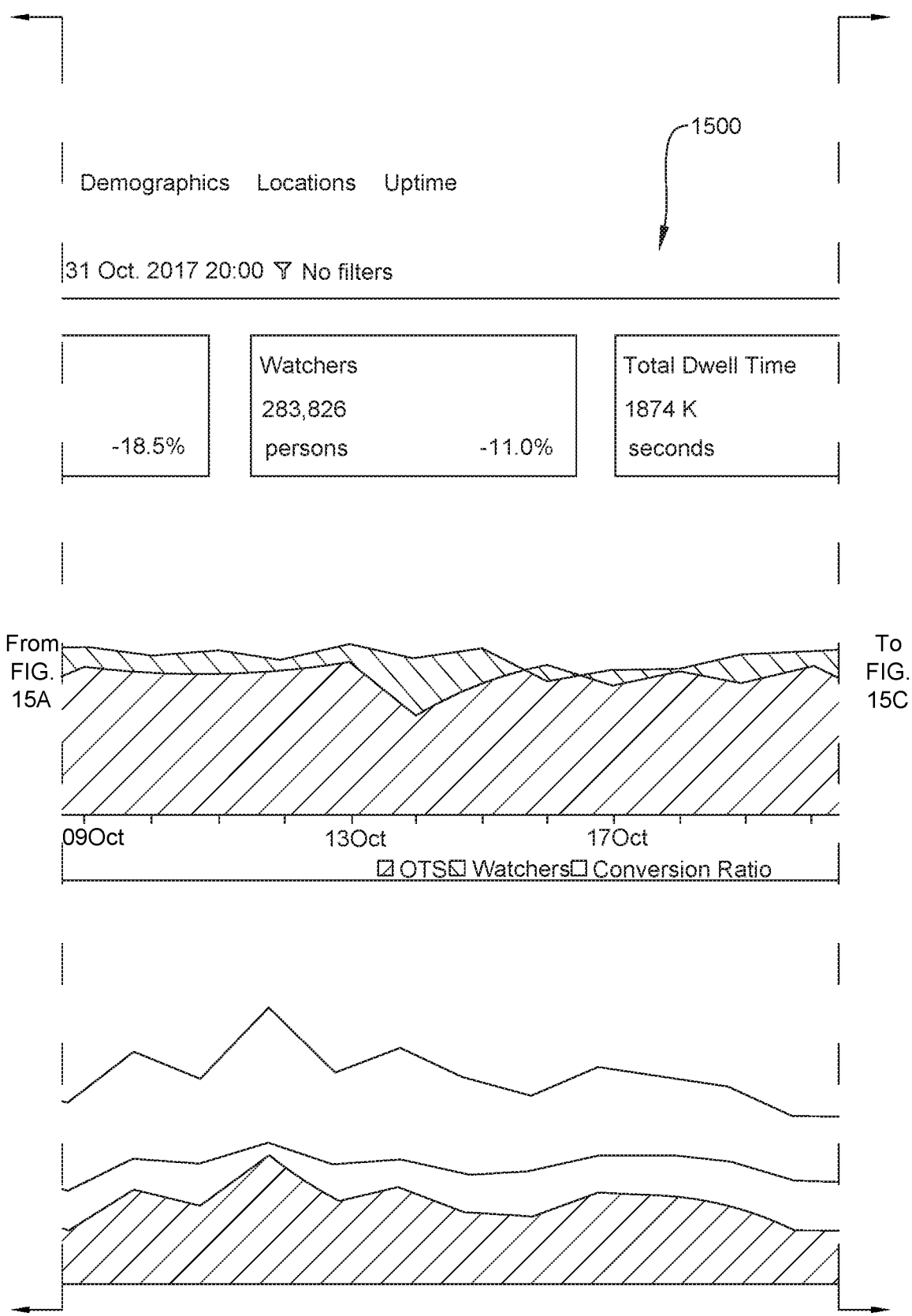
Figure 15C:
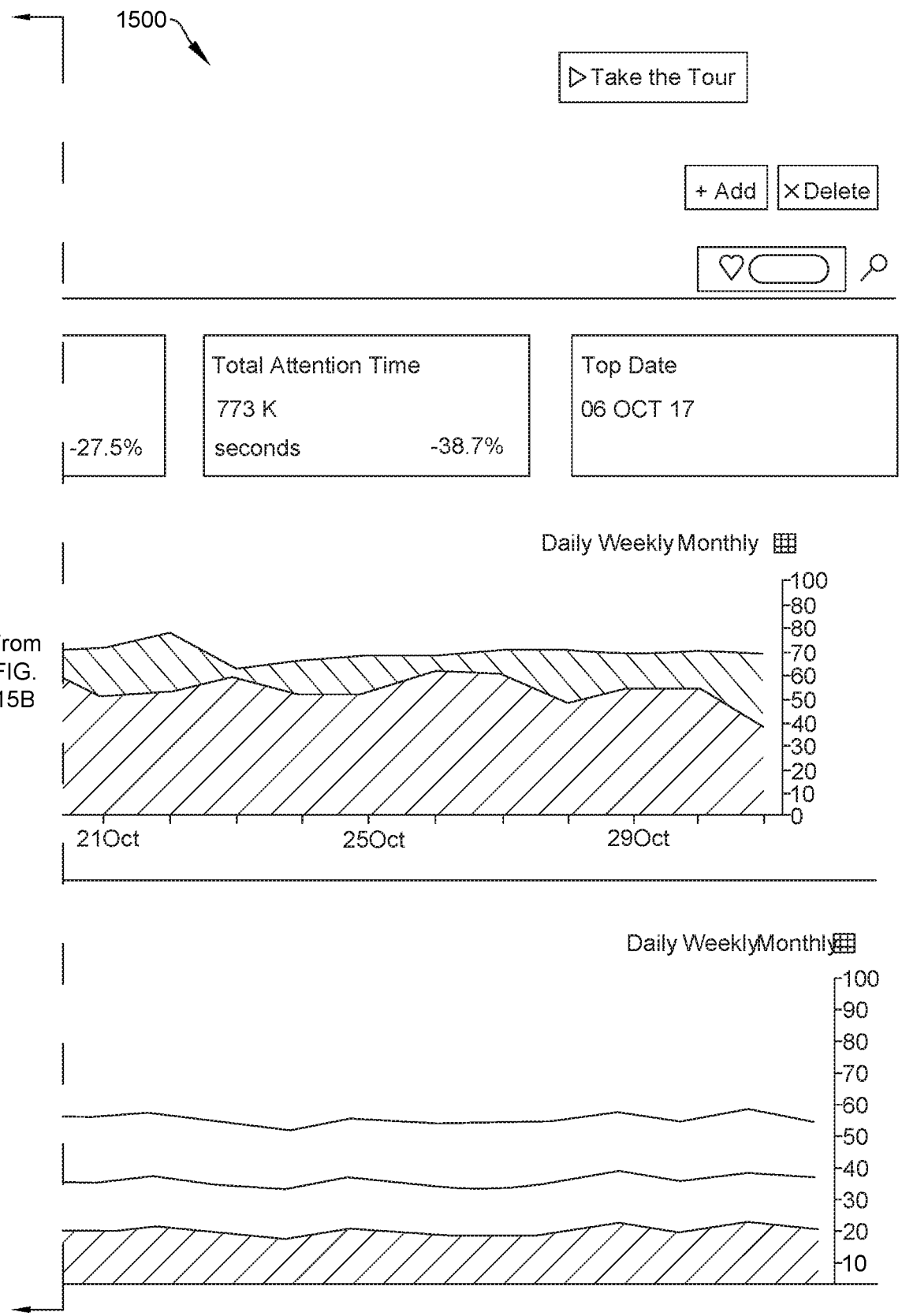
Figure 16A:
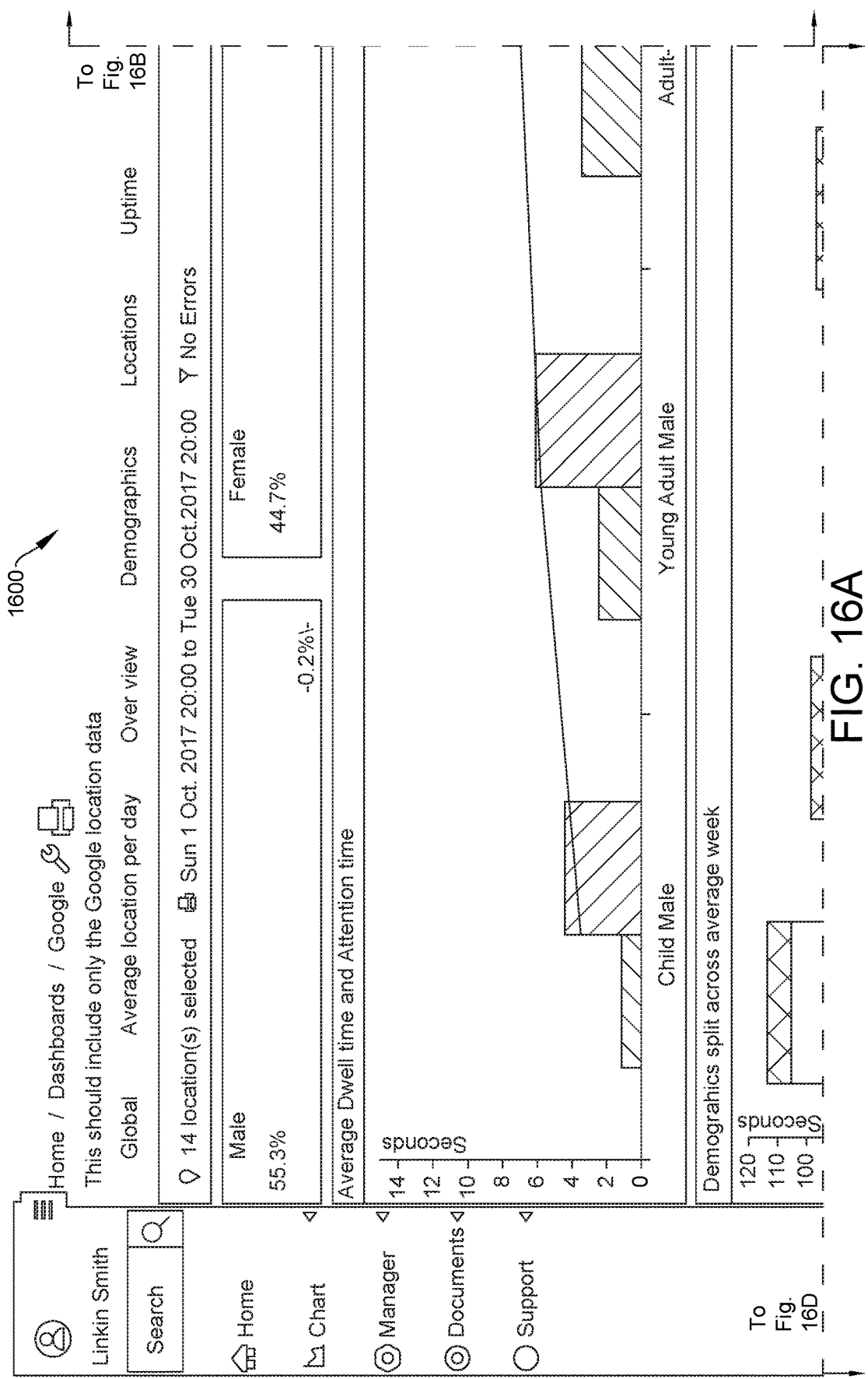
FIGS. 16A, 16B, 16C, 16D, 16E, and 16F are individual sections of a single is a screenshot from an embodiment of a system for monitoring automated store traffic and user behavior.
Figure 16B:
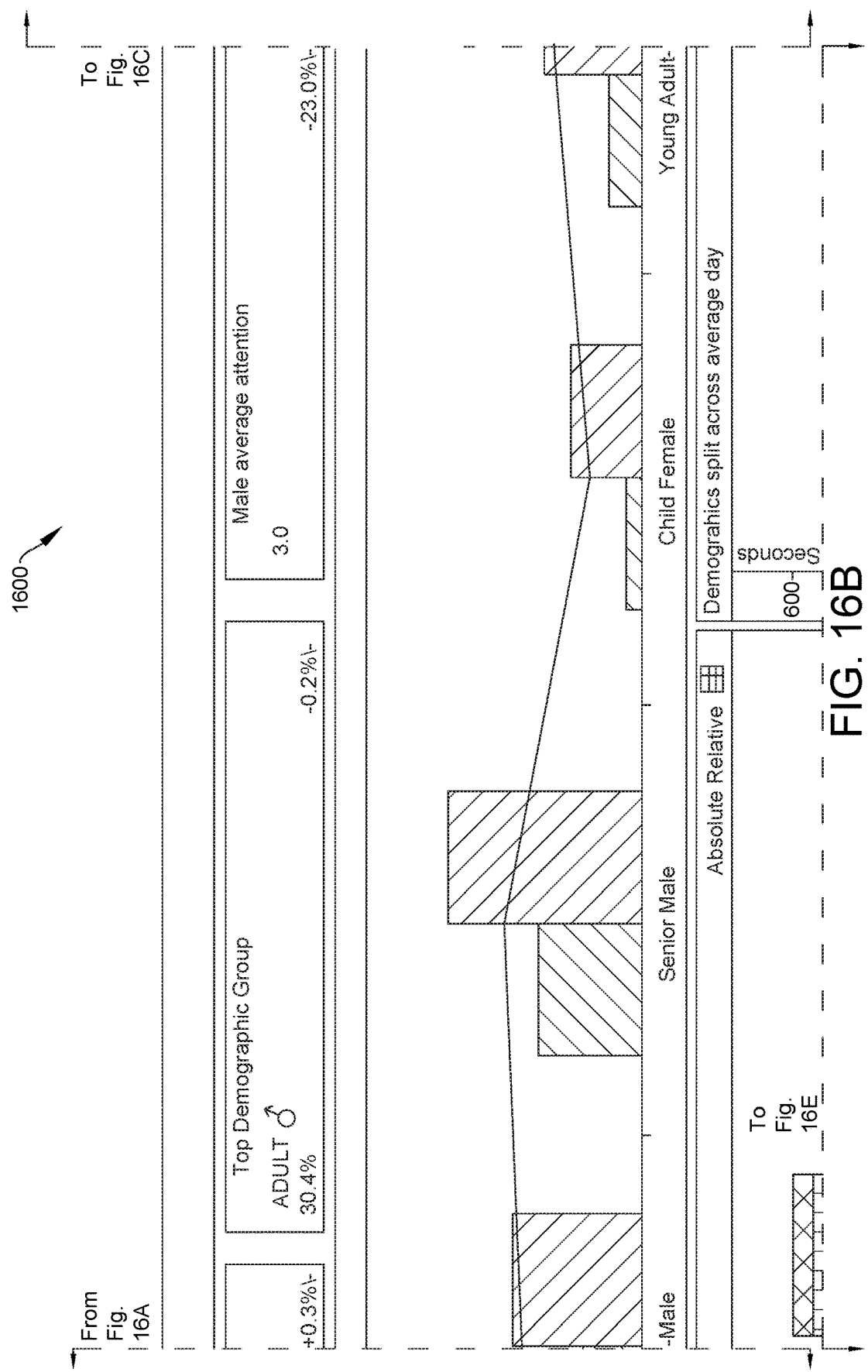
Figure 16C:
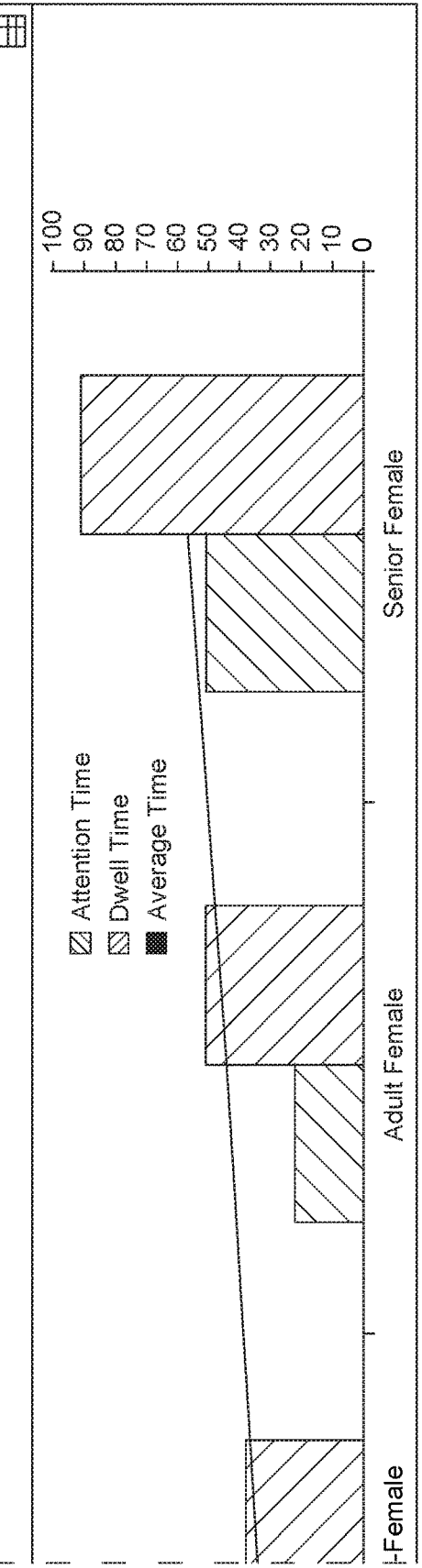
Figure 16D:
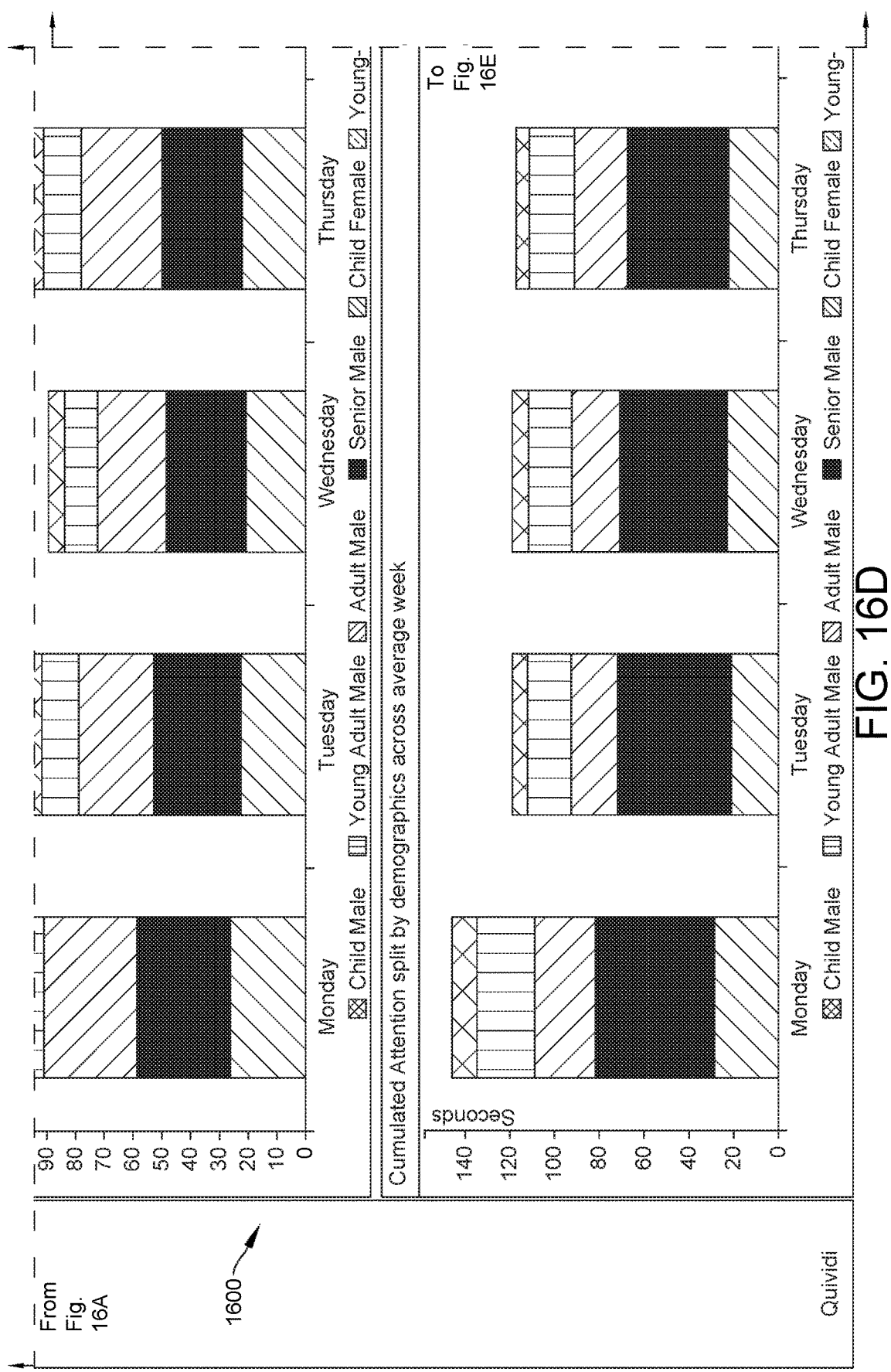
Figure 16E:
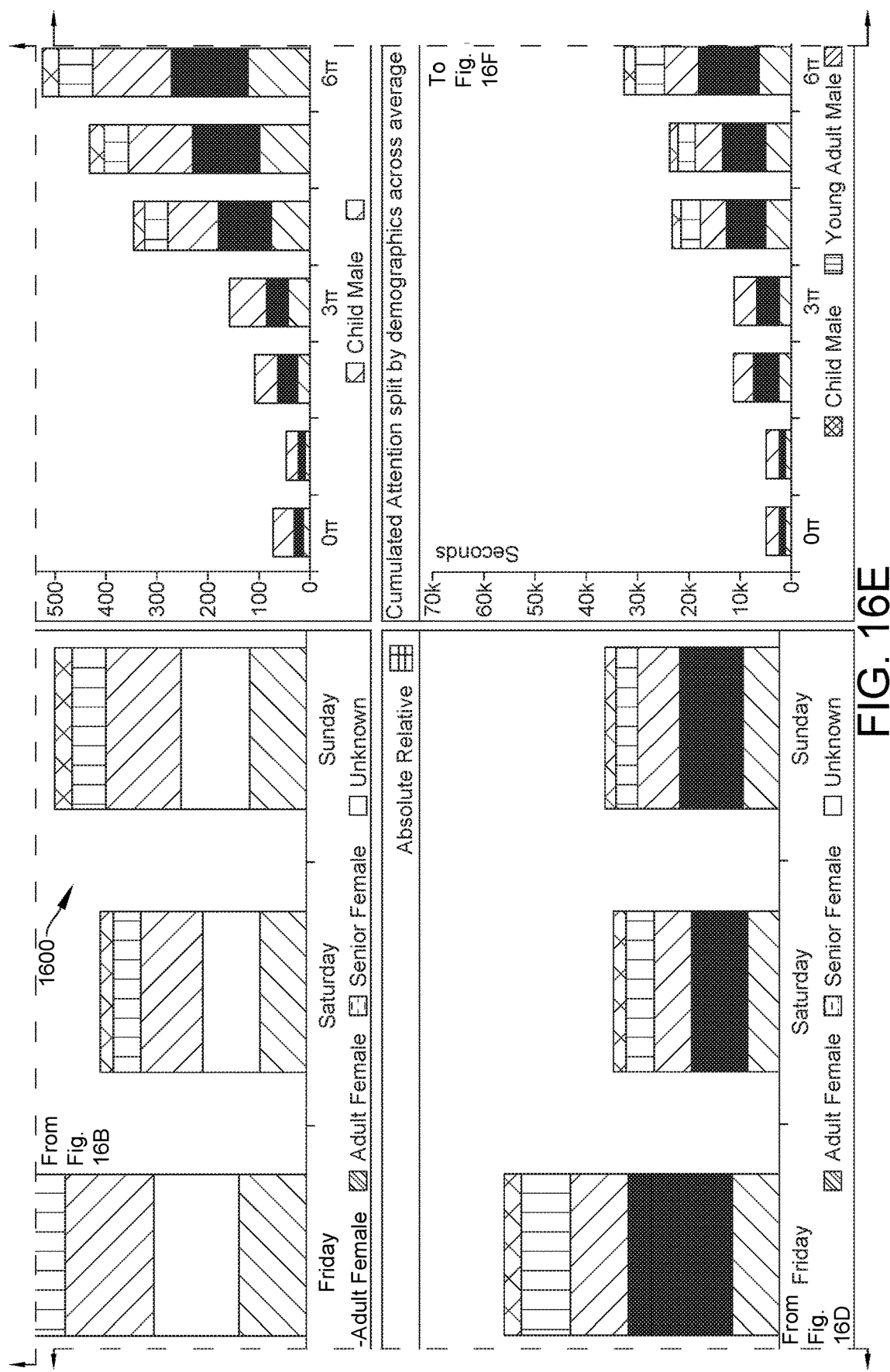
Figure 16F:
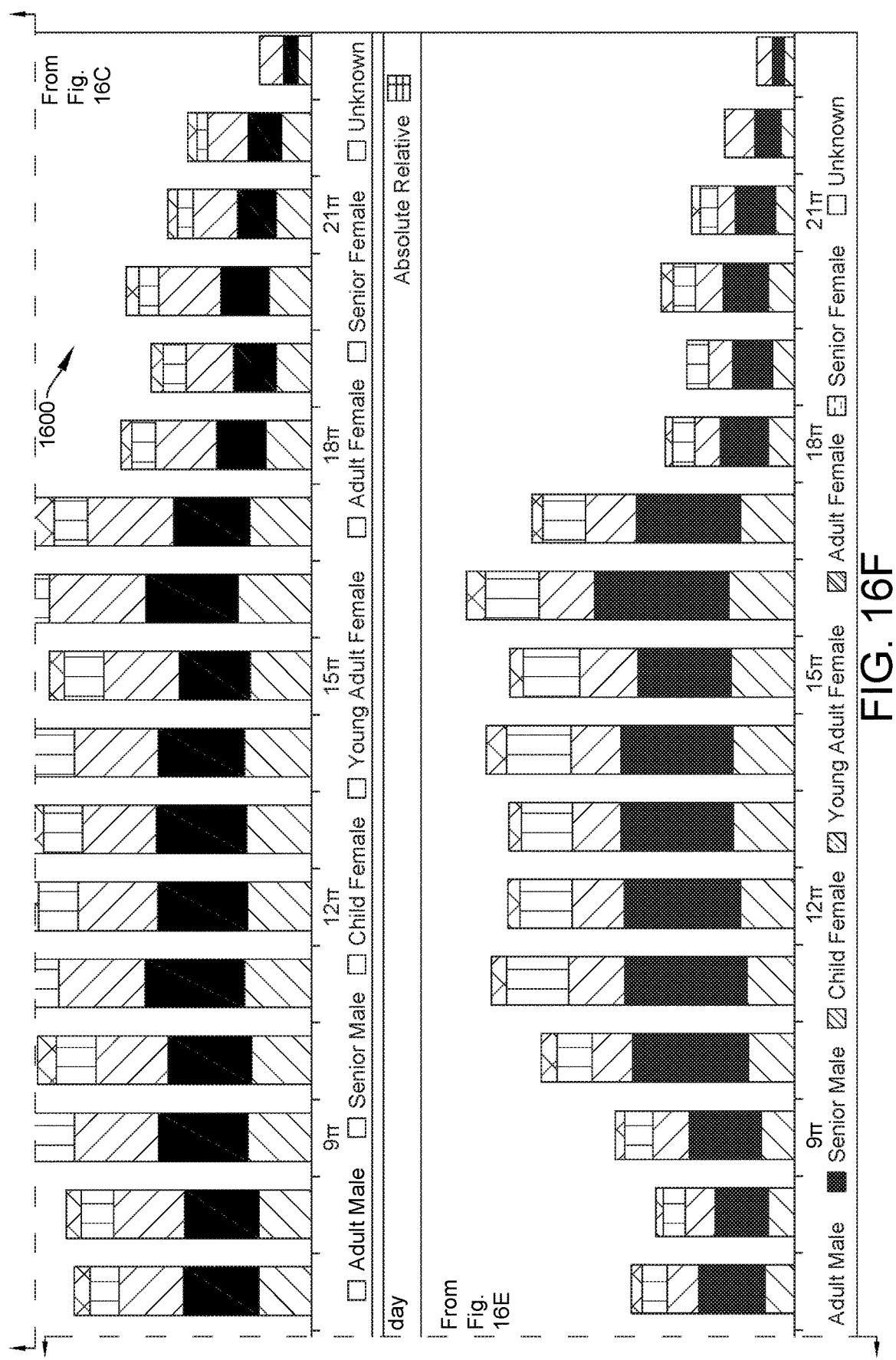

FIGS. 15A-15C, when combined as indicated in each figure, illustrate a single screenshot 1500 from an embodiment of a system for remotely managing automated store 100. In FIGS. 15A-15C, screenshot 1500 is from the monitoring program described with regard to FIG. 5. Screenshot 1500 further illustrates that traffic monitoring camera 1302 may obtain images that may be processed and analyzed to provide information regarding customers and potential customers of automated store 100. In FIGS. 15A-15C, an upper chart shows watchers and conversion ratio as a function of date, and a lower chart shows dwell time, attention time, and attraction ration as a function of date.

Figures 17A, 17B:
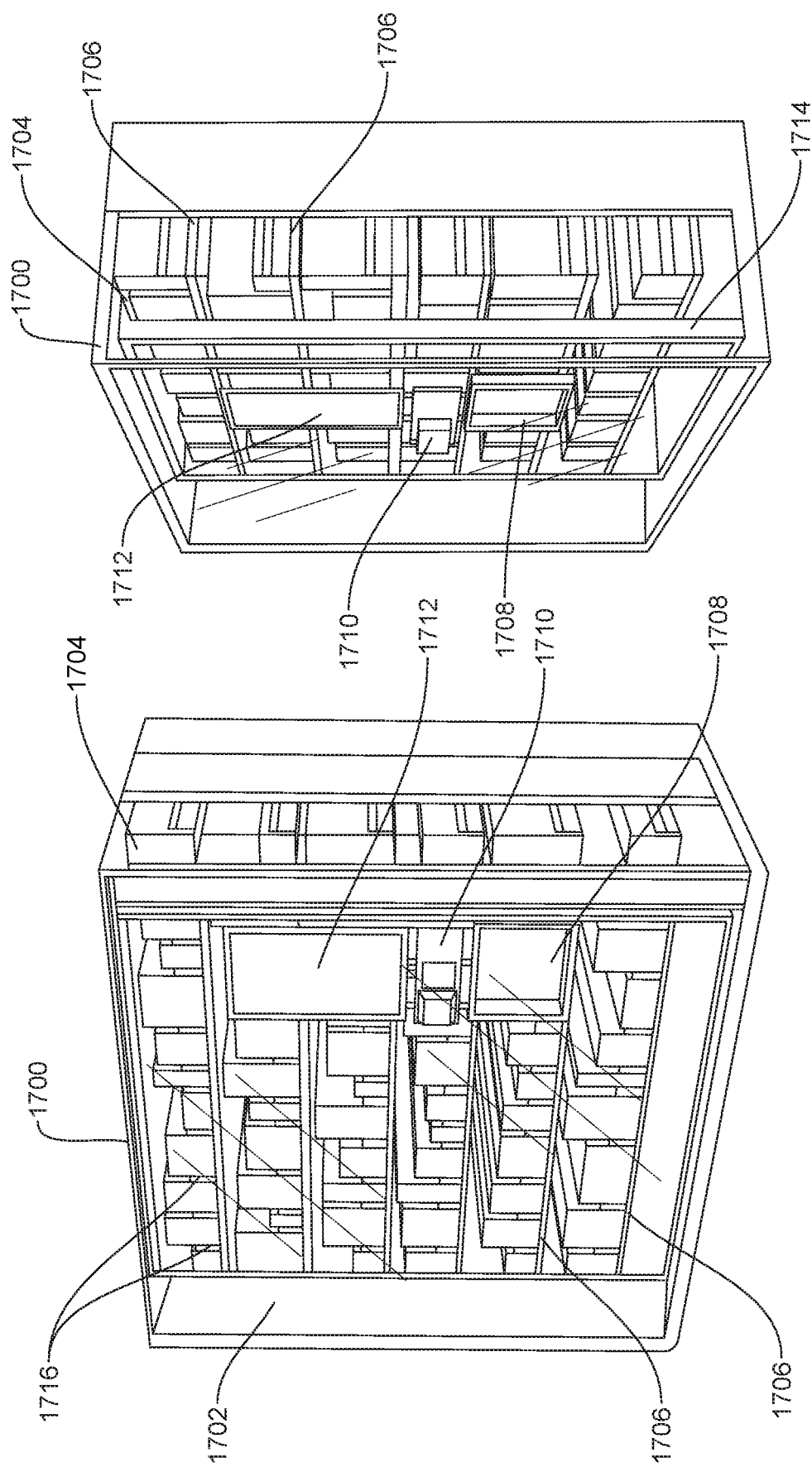
FIG. 17A is a perspective view of an embodiment of an automated store.
FIG. 17B is a perspective view of the embodiment of an automated store of FIG. 17A.

FIGS. 16A-16F, when combined as indicated in each figure, illustrate a single screenshot 1600 from an embodiment of a system for remotely managing automated store 100. In FIGS. 16A-16F, screenshot 1600 is from the monitoring program described with regard to FIG. 5. Screenshot 1600 further illustrates how traffic images may be processed and analyzed to provide information regarding customers and potential customers of automated store 100. FIG. 17A and FIG. 17B; and FIG. 18A and FIG. 18B depict further embodiments of automated stores. FIG. 17 and FIG. 18 illustrated primarily glass versions of an automated store. Primarily glass versions of automated stores get away from the look and feel of a typical automated store and move toward the look and feel of a retail showcase. The automated stores illustrated in FIG. 17 and FIG. 18 include a frame but no sheet metal on the front and very little on the sides. In the embodiments, wiring may be incorporated into the glass, or wireless communication may be used to minimize wiring and enhance a minimalist look and feel.

FIG. 17A and FIG. 17B are perspective views of an embodiment of an automated store 1700. Automated store 1700 is visually different from automated store 100 described above, but should be understood to include the internal parts of automated store 100 and function as described with regard to automated store 100. For that reason, automated store 1700 will be minimally described to reduce unnecessary duplication. In FIGS. 17A and 17B, automated store 1700 includes a transparent front panel 1702 and a transparent side panel 1704. Transparent front panel 1702 further includes a dispensing door 1708, a user interface 1710, a display screen 1712, and a controller (not shown). Automated store 1700 further includes shelves 1706, a Y-rail 1714, and dispensers 1716.

FIG. 18A and FIG. 18B are perspective views of an embodiment of an automated store 1800. As with automated store 1700, automated store 1800 is visually different from automated store 100 described above, but should be understood to include the internal parts of automated store 100 and function as described with regard to automated store 100. For that reason, automated store 1800 will be minimally described to reduce unnecessary duplication. In FIGS. 18A and 18B, automated store 1800 includes a transparent front panel 1802 and transparent side panels 1804 and 1805. Transparent front panel 1802 further includes a dispensing door 1808, a user interface 1810, a display screen 1812, and a controller (not shown). Automated store 1800 further includes shelves 1806, a Y-rail 1814, and dispensers 1816.

Regarding the embodiment of FIGS. 1-8C, camera 402 on fetch and delivery bucket 302 provides for the recording and transmitting of a video image of the dispense cycle to a remote database. The video image may be viewed by remote monitoring staff. Such videos may include videos of failed dispense cycles. The videos of the dispense cycles, successful as well as failed, may be identified and incorporated into a reference library of dispense cycles. Using AI methods, such as machine learning, the videos (failed dispense cycles, successful dispense cycles, or both) may be analyzed to so that the automated store may become more intelligent and reliable over time. For example, the AI analysis may determine procedural or structural changes intended to reduce failed dispense cycles. In addition, in the embodiment, the cameras can see what is happening in real time and provide this information to the controller, which may then instruct the X-Y positioning system how to adjust during a dispense cycle. For example, during a "fetch" phase of a dispense cycle, the controller may instruct the motors of the X-Y positioning system to adjust up or down, left or right, and in micro steps to ensure accuracy. Furthermore, during a dispense cycle, the controller may adjust the dispenser motor speed, the timing of when the fetch system returns to the home position, and the position of the flap that holds the product in the bucket as the bucket is moved to the "home" delivery position behind the dispensing door. In the embodiment, one or more IR sensors 408 in the bucket may detect when a product is placed in the bucket. The embodiment may include a camera, e.g., camera 410, with a field of view that captures a product being delivered into the delivery bin behind the dispensing door (e.g., dispensing door 110). The camera on the bucket or a camera on the delivery bin can transmit an image of the product in the bin real time (optical image recognition) to input into the dispense cycle logic. In embodiments with cameras or sensors that may identify products, the product recognition can verify that the consumer gets the correct product they ordered and not an incorrect one, which may occur if, e.g., a replenisher placed a product in the wrong location. Such product recognition is especially important for applications such as prescription drugs. In an embodiment, the fetch and delivery bucket may also dump products into a hold/recycle bin rather than deliver the product directly to an end customer through the dispensing door.

Regarding FIGS. 1-8C, camera 402 on bucket 302 may also be used to verify the actual existence of a specific product on the shelf and transmit the image to a remote database such as a database that would be accessible through a website or accessible by a mobile application executing on a mobile device. Such an application or website, for example, may provide for remote shopping for products in an automated store. In an embodiment, remotely-purchased products may be held by the automated store until the arrival of the end consumer or a delivery person. Camera 402 may transmit and image to the remote consumer of the actual, physical product on the shelf. Because the product is being held in a secure system, the system controller logic can ensure the product is not released until certain conditions are met, e.g., verification of the consumer identity through input of a code into the user interface 115, or face recognition via an image acquired from external camera 1302. A mobile app or website may provide the consumer with an image of the actual, available product and a message to the effect of, e.g., "Here it is, do you want to come and collect it or do you want it sent to you? Delivery method A will take X minutes and cost X$ or delivery method B will take Y minutes and cost Y$."

Still regarding FIGS. 1-8C, camera 402 on bucket 302 may also be used to create images or a video of the inventory in the machine by controller 120 positioning bucket 302 at each product location and instructing camera 402 to create and transmit an image or video. The images maybe transmitted to a remote database for viewing by an auditor who desires, e.g., visual evidence of the inventory to verify advice from a replenisher, or to confirm a service personnel's actions. If a replenisher is stealing products it will become obvious from the image analysis (camera 602 may also be used to create such images of replenisher or service personnel activities). The system (e.g., controller 120, a website, or a mobile application) may be programmed such that an image of inventory is recorded automatically immediately after a replenisher locks the door and returns the system to operational mode.

As discussed, camera 602, mounted in the upper left front corner of the automated store system, may also provide images. The intelligence from combining images or videos from camera 402 in the XY bucket with images from camera 602 may be improved over the intelligence from either camera alone. For example, to check on a replenisher's honesty, if there is missing inventory remote staff may analyze the static camera 602 video recording of what the replenisher actually did while at the machine. That information may be compared to or cross-referenced against inventory transaction data, whether entered from touch screen (e.g., display 130), scanner or other source such as the images of the inventory from camera 402 on bucket 302.

Thus, in an embodiment of a method, the apparatus of FIGS. 1-8C may be remotely monitored using images acquired from one or more of the cameras by: acquiring and storing images of the automated store inventory before a replenishment; receiving information showing products purportedly added to the automated store inventory; acquiring and storing images of the automated store inventory after the replenishment; and comparing the stored images before and after the replenishment to determine whether the products purportedly added to the automated store inventory were in fact added to the automated store inventory. In an embodiment, RFID scanners at each product location may collect data regarding product additions and the timing and be used to confirm whether the replenishment was performed as before to determine whether the replenishment as directed. In an embodiment, the identify of a replenisher may be confirmed by providing each replenisher with a replenisher-specific code for the electronic locks. In the embodiment, the code used to access an automated store during a replenishment is associated with data (e.g., images, IR, and RFID data) associated with the replenishment so that issues found from analysis of the replenishment data may be associated with the appropriate replenisher.

In an embodiment, the combination of data from multiple cameras along with data from sensors either in the delivery bucket or on the shelves may provide intelligence that may be used to improve dispense cycle reliability. Static camera 602 may optically see the product removed from the shelf to the bucket, and identify which product was moved. Camera 402 in bucket 302 may verify the transfer from shelf to delivery system, and identify the product from close-up. And shelf sensors, such as infrasonic, capacitive, magnetic, optical (IR sensor 408) or RFID sensor 410 may detect transfer off the shelf. The exact quantity of each product may depend on the sensor system.

In an embodiment, the sensors (e.g., cameras and other sensors) track the bucket vending position and collect data (e.g., images and RFIDs) that provide information allowing the controller, application, or website, to check inventory levels. In addition, data from these sensors enables the system to create a virtual planogram (a physical merchandise layout) of the products within the automated store.

Personnel, e.g., a technician, may then copy the planogram from a computer or a piece of paper to physically make the changes. The system may then check the technician's work by checking whether the layout matches the expected virtual layout, and this removes errors from the system. For example, the technician may compare the virtual planogram against the actual automated store layout, note where the virtual planogram is inaccurate, make corrections to the virtual planogram, and input the corrections onto the virtual planogram. The system may, using AI methods, review the changes against the data used to make the virtual planogram and determine how to improve the creation of the virtual planogram so that it is more accurate. In an embodiment, personnel could create various planograms to see what works with the automated store, e.g., physically lay out the planograms to see what "works," then scan the planogram into the system, which then virtually duplicates layout (or layouts) as potential planograms. In an embodiment, the sensors in the bucket (e.g., camera 402) may be used for visual recognition of the product on the shelf in a physical layout to tell the virtual system the exact product on the shelf. For example, the system may take camera images combined with data of the bucket location to determine the product actually at each individual product shelf location. The determined product may be input into the virtual planogram to correct or verify the product in the virtual planogram. Similar, in an embodiment, the system, using data obtained from the various sensors, may determine the identity of the replenished product (not just the inventory levels) to verify that the product is the correct product for that shelf position. In an embodiment, the inventory levels of the system are known virtually (e.g., using the virtual planogram). When a replenishment order is raised (i.e., currently 5 in stock, ship 10 more), a replenisher does the physical work to stock the shelf. As stated, the system knows it has 5 of the particular product. With the raising of the replenishment order, the system receives a communication telling the system to expect 10 more. When the replenisher loads the new stock, the inventory counter (e.g., the system using the sensors to detect product and data of the bucket location to develop an inventory) can then check the positions and check the inventory levels to have a complete closed loop inventory count of all items in the system. Such a closed-loop inventory count removes errors in inventory and drastically speed up the replenishment process by removing the need for manual inventory counts. In an embodiment, the sensors may collect data that the system interprets and determines that an item may not have been dispensed properly. The system may then try to automatically resolve the improper dispensing by using the conveyor bucket to dispense the product back onto the shelf, or into a waste area. Such an automatic resolution of an improper dispense cycle eliminates the need for a technician to visit the automated store to remove a jam or dispense failure.

Regarding FIGS. 5-12, in an embodiment, automated store 100 may be remotely managed by software that incorporates workflows that may be followed by skilled or even relatively unskilled personnel with no specific automated store experience to complete a task addressed by the workflow. Remote electronic locks 806, 808 may be incorporated in the automated store to ensure the security of the product and to provide an audit trail regarding who has had access to the interior of the automated store and when. The automated locks may be unlocked with software codes. Such remote control of the automated locks facilitates the efficient central management of the automated store, increases security, and optimizes efficient utilization and dispatch of authorized personnel. The remote software system may include and maintain a database of available resources, such as contact information for technical staff to maintain the system when something breaks, or for replenishers who may receive inventory and replenish the automated store.

The automated software may include an automated ticketing and alert system for maintenance of automated stores in which algorithms analyze data streams being transmitted in real time from the store network from, e.g., store cameras and sensors. When certain events or sets of data are such that an algorithm determines that an alert condition exists, then an alert may be raised automatically by the software system executing, e.g., on controller 120. Alerts may be categorized into two types: dispatch alerts and research alerts. A dispatch alert automatically opens a ticket in the ticketing system and transmits the ticket to the appropriate service provider for that machine. The alert received by the service provider includes details of the alert, the automated store machine, and the location details. Included with the alert is data that is extracted from a database to advise the services what parts, supplies, and tools are required to fix the alert. Such information may be transmitted via email, SMS or other electronic form to a PC or handheld device such as a mobile communications device. The alert may also be transmitted to the automated store so that, when the replenisher arrives and identifies themselves through the automated store authentication process, the process looks up and verifies the services credentials in real time. Once the replenisher or service personnel is logged in the alert appears on the service screen of the automated store. Included with the alert (on the automated store display as well as on the mobile communications device or PC that the alert was also sent to) is workflow information that lists the steps for resolving the alert, and may also track the services being performed by the replenisher or service personnel through the steps. Such workflow instructions may include text, images, video instructions, or voice narrative, or a combination of these. In embodiments, the system may also offer click-to-connect live to call center or NMS technical staff to allow real time video or text assistance. Where the call is directed may depend on where the service person is in the workflow process (i.e., call center at start of process, but NMS later in the workflow if advanced technical support is required).

When an alert is raised a time stamp may be recorded in the database. A time stamp may also be recorded when the service person acknowledges the alert, which allow the responsiveness (SLA compliance) of that service person to be tracked. The automated store sensors and cameras can be used to help verify and record information that can be fed into the workflow process. For example, the standard time for a service can be recorded by a timestamp automatically generated when the servicer authenticates at the automated store. A timestamp may be generated when the doors are unlocked. And a timestamp may be generated when the system is returned to operational mode. The automated store controller can transmit information such as information regarding dispense test cycles and what was done by a servicer. The internal camera can acquire a video recording of servicer activity that may be stored in the database against the alert such that NMS staff can retrieve and review the video against the alert.

Thus, in an embodiment the automated store may automatically detect failures and initiate repair by: acquiring data regarding the automated store from at least one of a camera, an IF sensor, or an RFID sensor; storing the data in a database; analyzing by the controller or other analysis software; the stored data; determining from the data analysis that a failure or alert condition exists; and sending, by the controller a message to a service provider regarding the determined failure or alert condition.

In an embodiment there are workflow systems for replenishment of the automated store stores. In the embodiment, the replenishment orders are automatically generated through the automated software, which may include a supply chain management software module. When replenishment orders are shipped out of a distribution center (DC) the contents of the shipment are transmitted to the automated store. When the replenisher loads the shelves the replenisher advises the system of the number of items of each product. If the logical count varies, the automated store replenishment screen (e.g., display 130) asks the servicer to review without telling them the correct answer. In an embodiment, the inventory count may be transmitted automatically by reading sensors, e.g., RFID sensors at each product location. The cameras in the automated store can be used to create an inventory count, and can also be used to record the replenishment process in video file that is stored in the database against the replenishment, and can also be used to create and store a visual of the inventory display before and after replenishment (for audit purposes). The workflow instructions can guide an untrained replenisher through the restocking process.

Thus, in an embodiment of a method, the apparatus of FIGS. 1-8C may be remotely inventoried using images acquired from one or more of the cameras or using data from RFID sensors, or data from both cameras and RFID sensors by: the controller receiving data regarding a dispensed product; the controller identifying the dispensed product from the received data; and the controller deducting the dispensed product from an inventory of products in the automated store. In embodiments, the data regarding the dispensed product may be received from at least one of: a camera within the automated store, an RFID scanner at a product shelf location, an RFID scanner on the fetch and delivery bucket. In an embodiment, the dispensed product may be deducted from an initial inventory that was performed by: the controller positioning a camera at each product shelf location; the camera acquiring images at each product shelf location and storing the images in a database accessible by the controller; the controller analyzing the stored images to determine the inventory of the automated store. In an embodiment, the dispensed product may be deducted from an initial inventory that was performed by: RFID sensors at each product shelf location acquiring data of products placed at the shelf locations during a replenishing; the RFID sensors storing the acquired data in a database accessible by the controller; the controller analyzing the stored data to determine the inventory of the automated store. In an embodiment, the inventory of the automated store may be monitored in real time by the controller determining a running inventory after performing an initial inventory, with the dispensed products being determined using data from at least one of camera images and RFID sensors. In the embodiment, as the controller determines that the remaining number of any particular product drops below a threshold value, the controller may send a re-order request to a replenisher for that particular product to be replenished.

In an embodiment, the automated store electronic lock also allows central issuance of authentication information to allow services to be activated and deactivated remotely. When combined with the automated store workflow system this improves flexibility and increases SLA response times and reduces reliance on individuals.

In an embodiment, machine learning software can analyze videos of service routines that are performed to learn best practices and to incorporate into AI systems where the machine learns how to self-correct. For example, service routines that are performed in minimal time may be recorded and identified as exemplary for incorporation and analysis by the AI system. Remote staff using cameras may remotely operate the automated store machines, and such operations could be automated by machine learning systems over time.

Regarding FIGS. 13a-16, in an embodiment, an automated store may include a traffic monitoring and user behavior monitoring system. Camera 1302 provides images that may be analyzed to provide data for the monitoring system. In the embodiment, the traffic and user behavior monitoring system may, e.g., count traffic, may measure how many people stop to watch, may measure user session length, may measure user engagements to shop at the machine, and may measure conversions to sales transactions. The system may also analyze camera data to measure demographics of watchers. Such demographic data can be combined with transactional data, such as products purchased. The data may be transmitted (preferably without identifying people personally) to remote databases and be available for viewing in a dashboard by location or by groups of locations or by products sold from groups of locations. In the embodiment, when a watcher or potential consumer is detected the system may also collect dwell time and emotion and other data about the consumer. The demographic data may be combined with media serving capability at an automated store—where ads may be cued based on demographic or ethnicity, emotion or other data determined by the system based on the images from the monitoring camera/software. Embodiments of the automated store system incorporate the monitoring capability with the ability to serve demographic-specific offers both on the store promotional display screen 130 and on the user interface (shopping transaction screen) on the website or mobile application. In an embodiment, the automated store may learn about its consumers and personalized transactions and subsequently make targeted offers to potential customers as part of its consumer experience, and without consumers being identified personally. In an embodiment, the monitoring and user behavior system may also combine anonymous information with account information where users have opted in and agree to be recognized personally.

In an embodiment, an automated store allows printing of individual product labels before dispensing. Some applications, such as the dispensing of prescription drugs, require labels to be fixed to the product as part of the process. If drugs are prepackaged in appropriate quantities then an automated store can be used to automate the dispensing of drugs. In an embodiment, a printer (thermal or inkjet) is mounted on the front of bucket 302 and the product packaging is designed to allow custom printing on the front facing of the package. In the embodiment, bucket 302 moves to the product location on the shelf. Bucket 302 then holds the product in place by engaging a dispenser and driving a pusher at the back of the row of products to move the packages forward until the first product is flush with the front edge of the shelf and against the printer. The appropriate information may then be printed on the package.

In an embodiment, an automated store automatically recognizes members or loyal customers and personalizes their transaction. An outward facing camera of an automated store and software that references a customer image library in, e.g., the remote database, in real time provides for facial recognition of a returning customer. The returning customer may be a returning customer of a specific type/brand of automated store, a returning customer from any brand of automated store in the network, or a returning customer from any automated store in the network.

In an embodiment, an automated store may provide a mobile application where the exact (or functionally similar) consumer experience on a touch screen of an automated store is offered on a mobile phone so that consumers can shop and pay from their phone without having to touch the machine or go to the machine. The application may transmit near-field communication (NFC) or quick response (QR) codes to a customer's phone (or on the automated store), which the customer may present to a camera at the automated store to collect purchases.

Figure 19:
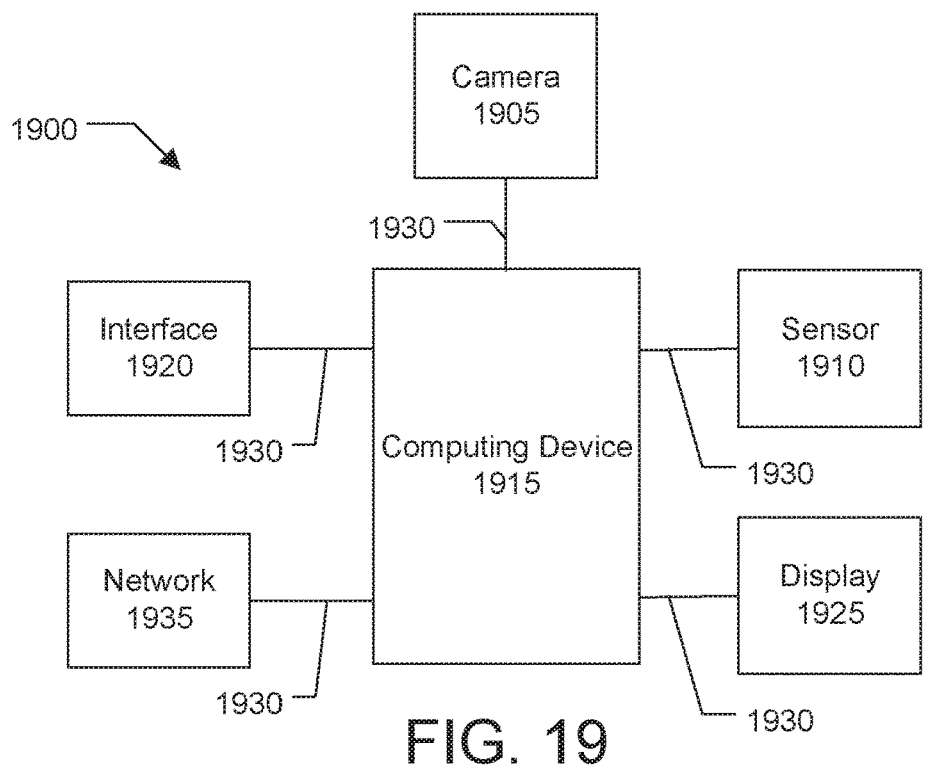
FIG. 19 is a simplified, exemplary block diagram of an embodiment of a system for controlling a dispenser of shelved products.

FIG. 19 is a simplified, exemplary block diagram of an embodiment of a system 1900 for implementing the embodiments of systems and methods disclosed herein. System 1900 may include a number of input devices such as, e.g., a camera 1905 (e.g., cameras 402, 410, and 602), a sensor 1910 (e.g., IR sensor 408, RFID scanner 412), a user interface 1920 (e.g., user interface 115), an interactive display 1935 (e.g., display 130). Sensors 1905, 1910, 1920, and 1925 are in communication with a computing device 1915 (e.g., controller 120, or the PC within peripheral box 306). Computing device 1915 may further be in control of, e.g., bucket 302, cameras 402, 410, 602, X-Y positioning system 304, and dispensing door 110. Computing device 1915 may receive input from interface 115 and display 130, and display information on interface 115 and display 130. Sensors 1905, 1910, 1920, and 1925 may supply data to computing device 1915 via communication links 1930 or other network 1935.

Computing device 1915 may include a user interface (e.g., interface 115) and software, which may implement the steps of the methods disclosed within. Computing device 1915 may receive data from sensors 1905, 1910, 1920, and 1925, via communication links 1930, 1935, which may be hardwire links, optical links, satellite or other wireless communications links, wave propagation links, or any other mechanisms for communication of information. Various communication protocols may be used to facilitate communication between the various components shown in FIG. 19. Distributed system 1900 in FIG. 19 is merely illustrative of an embodiment and does not limit the scope of the systems and methods as recited in the claims. In an embodiment, the elements of system 1900 are incorporated into an automated store (e.g., automated store 100). One of ordinary skill in the art would recognize other variations, modifications, and alternatives. For example, more than one computing device 1915 may be employed. As another example, devices 1905, 1910, 1920, and 1925 may be coupled to computing device 1915 via a communication network (not shown) or via some other server system.

Computing device 1915 may be responsible for receiving data from devices 1905, 1910, 1920, and 1925, performing processing required to implement the steps of the methods, and for interfacing with the user. In some embodiments, computing device 1915 may receive processed data from devices 1905, 1910, 1920, and 1925. In some embodiments, the processing required is performed by computing device 1915. In such embodiments, computing device 1915 runs an application for receiving user data, performing the steps of the method, and interacting with the user. In other embodiments, computing device 1915 may be in communication with a server (e.g., via network 1935), which performs the required processing, with computing device 1915 being an intermediary in communications between the user and the processing server.

System 1900 may enable users to access and query information developed by the disclosed methods. Some example computing devices 1915 include devices running the Apple iOS®, Android® OS, Google Chrome® OS, Symbian OS®, Windows Mobile® OS, Windows Phone, BlackBerry® OS, Embedded Linux, Tizen, Sailfish, webOS, Palm OS® or Palm Web OS®.

Figure 20:
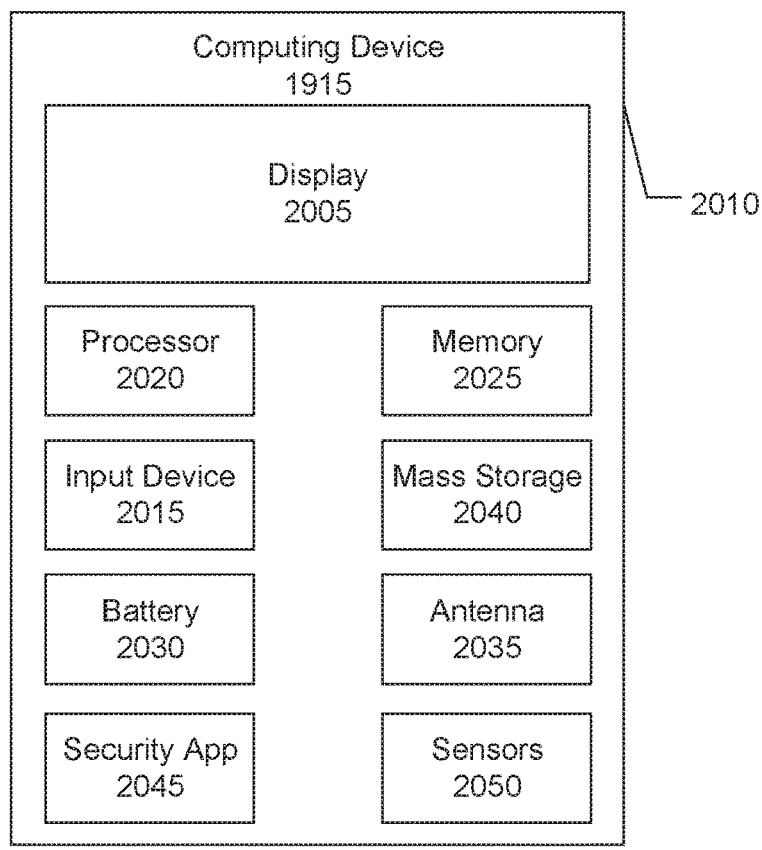
FIG. 20 is an exemplary block diagram of a computing device from the system of FIG. 19.

FIG. 20 is an exemplary block diagram of a computing device 1915 from the system of FIG. 19. In an embodiment, a user interfaces with the system through computing device 1915 (e.g., though user interface 115, display 130, and network 2035), which also receives data and performs the computational steps of the embodiments. Computing device 1915 may include a display, screen, or monitor 2005, housing 2010, input device 2015, sensors 2050, and a security application 2045. Housing 2010 houses familiar computer components, some of which are not shown, such as a processor 2020, memory 2025, battery 2030, speaker, transceiver, antenna 2035, microphone, ports, jacks, connectors, camera, input/output (I/O) controller, display adapter, network interface, mass storage devices 2040, and the like. In an embodiment, sensors 2050 may include sensors 1905, 1910, 1920, and 1925 in communication with computing device 1915

Input device 2015 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Display 2005 may include dedicated LEDs for providing directing signals and feedback to a user.

Mass storage devices 2040 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

System 2000 may also be used with computer systems having configurations that are different from computing device 1915, e.g., with additional or fewer subsystems. For example, a computer system could include more than one processor (i.e., a multiprocessor system, which may permit parallel processing of information) or a system may include a cache memory. The computing device 1915 shown in FIG. 20 is but an example of a computer system suitable for use. For example, in a specific implementation, computing device 1915 is mounted to an automated store and in communication with the sensors, devices, and positioning systems of the vending machine. Other configurations of subsystems suitable for use will be readily apparent to one of ordinary skill in the art.

The following paragraphs include enumerated embodiments.

1. An automated store comprising: a plurality of product locations; a platform within the automated store and movable between a plurality of first platform positions and a second platform position adjacent to a dispensing area, each first platform position being adjacent to a product location; a security door with a first door position and a second door position, the security door hindering access to the platform through the dispensing area when in the first door position and not hindering access to the platform when in the second door position; a first camera connected to the platform, the first camera capturing a first field of view including at least part of the platform and at least part of an adjacent product location when the platform is at a first platform position; a positioning system connected to the platform such that the platform is movable by the positioning system between each of the plurality of product locations and the dispensing area; a controller including a processor and memory, the memory including instructions, the controller communicably connected to the first camera and the positioning system; and a network connector for connecting the first camera and controller to a database through a network. In an embodiment, a plurality of automated stores may be located within the same location or adjacent to each other within the same location.

2. The automated store of embodiment 1 further comprising a second camera connected to the platform and communicably connected to the controller and network connector and capturing a second field of view, wherein, when the platform is at the second platform position and the security door is in the second door position, the second field of view includes at least part of the platform and at least part of the dispensing area.

3. The automated store of embodiment 1 further comprising a third camera connected to the platform and communicably connected to the controller and network connector and capturing a third field of view including an interior area of the automated store between the plurality of product locations and a front panel.

4. The automated store of embodiment 1, wherein the platform includes a flap movable from a first flap position to a second flap position, the second flap position inclined such that when the platform is in the second flap position, the flap slants downward in a direction toward the dispensing door.

5. The automated store of embodiment 1 further comprising a user interface and an electronic lock communicably connected to the network connector, the electronic lock controllable using the user interface and through a network.

6. The automated store of embodiment 1, further comprising a sensor associated with the platform, the sensor one of: an infrasonic sensor, a capacitive sensor, an infrared sensor, a magnetic sensor, or an optical sensor. In an embodiment a sensor associated with a platform may include one of: an infrasonic sensor, a capacitive sensor, an optical sensor, an infrared sensor, optical sensor or other type of usable sensor.

7. The automated store of embodiment 1, further comprising a sensor associated with each of the plurality of product locations, the sensor one of: an infrasonic sensor, a capacitive sensor, an infrared sensor, a magnetic sensor, or an optical sensor. In an embodiment a sensor associated with each of the product locations may include one of: an infrasonic sensor, a capacitive sensor, an optical sensor, an infrared sensor, optical sensor or other type of usable sensor.

8. A method comprising: providing an automated store comprising: a plurality of product locations; a platform within the automated store and movable between a plurality of first platform positions and a second platform position adjacent to a dispensing area, each first platform position being adjacent to a product location; a security door with a first door position and a second door position, the security door hindering access to the platform through the dispensing area when in the first door position and not hindering access to the platform when in the second door position; a first camera connected to the platform, the first camera capturing a first field of view including at least part of the platform and at least part of an adjacent product location when the platform is at a first platform position; a positioning system connected to the platform such that the platform is movable by the positioning system between each of the plurality of product locations and the dispensing area; a controller including a processor and memory, the memory including instructions, the controller in communication with the first camera and the positioning system; and a network connection connecting the first camera and controller to a database through a network; acquiring, by the controller, first images from the first camera; and storing, by the controller, the acquired first images in the database.

9. The method of embodiment 8, wherein the first images are acquired when the platform is at the first platform position adjacent to the product location, the method further comprising: analyzing, by the controller, the acquired first images to develop data representing the position of the platform with respect to the product location; and directing, by the controller using the developed data, the positioning system to move the platform with respect to the shelf position.

10. The method of claim 8, wherein the acquired first images include images of a product, the method further comprising: analyzing the acquired first images to identify a product dispensed to a customer. The method in claim 10 wherein the acquired first images include images of a product, the method further comprising: analyzing the acquired first images to identify multiple selected products dispensed to a customer during the same event—(Multy-Vend). The method of claim 10, wherein the acquired first images are analyzed by an administrator to identify the product dispensed to a customer. The method of claim 10 wherein the platform camera is used to verify customer has removed product from customer delivery area 11. The method of claim 10, wherein the acquired first images are analyzed by an administrator to identify the product dispensed to a customer.

12. The method of claim 10, wherein the acquired first images are analyzed by an image recognition module executing on a server to identify the product dispensed to a customer. The method of claim 12 wherein the acquired first images are of customer removal of product from a customer delivery area.

13. The method of claim 8, wherein the acquired first images include images of a product, the images being accessible by a mobile application. The method of claim 13 wherein the acquired first images are of customer removal of product from a customer delivery area.

14. The method of claim 8, wherein the acquired first images include images of a plurality of transfers of product from the product location to the platform, the images being analyzed to develop instructions for improving the transfer of product from the product location to the platform, the method further comprising: receiving, by the controller, the developed instructions; and adjusting, by the controller using the developed instructions, a transfer of product from the product location to the platform.

15. The method of claim 14, wherein the adjusting the transfer of product includes at least one of: adjusting, by the controller, a speed of transfer of product from the product location to the platform; or adjusting, by the controller, a position of the platform during the transfer of product from the product location to the platform.

16. The method of claim 8, wherein the provided automated store further comprises a second camera connected to the platform and in communication with the controller and network connection and including a second field of view, wherein, when the platform is at the second platform position and the security door is in the second door position, the second field of view includes at least part of the platform and at least part of the dispensing area, the method further comprising: acquiring, by the controller, second images from the second camera; and storing, by the controller, the acquired second images in the database.

17. The method of claim 16, wherein the second images are acquired when the platform is at the second platform position adjacent to the dispensing area, the method further comprising: analyzing, by the controller, the acquired second images to develop data representing the position of the platform with respect to the dispensing area; and directing, by the controller using the developed data, the positioning system to move the platform with respect to the dispensing area.

18. The method of claim 16, wherein the acquired second images include images of a product, the method further comprising: analyzing the acquired second images to identify a product dispensed to a customer.

19. The method of claim 18, wherein the acquired second images are analyzed by an administrator to identify the product dispensed to a customer.

20. The method of claim 18, wherein the acquired second images are analyzed by an image recognition module executing on a server to identify the product dispensed to a customer.

21. The method of claim 16, wherein the acquired second images include images of a product, the images being accessible by a mobile application.

22. The method of claim 16, wherein the acquired first images include images of a plurality of transfers of product from the platform to the dispensing area, the images being analyzed to develop instructions for improving the transfer of product from the platform to the dispensing area, the method further comprising: receiving, by the controller, the developed instructions; and adjusting, by the controller using the developed instructions, a transfer of product from the platform to the dispensing area.

23. The method of claim 22, wherein the adjusting the transfer of product includes at least one of: adjusting, by the controller, a speed of transfer of product from the platform to the dispensing area; or adjusting, by the controller, a position of the platform during the transfer of product from the platform to the dispensing area.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

We claim:

1. An automated store comprising:
    a plurality of product locations;
    a platform within the automated store and movable between a plurality of first platform positions and a second platform position adjacent to a dispensing area, each first platform position being adjacent to a product location;
    a security door with a first door position and a second door position, the security door hindering access to the platform through the dispensing area when in the first door position and not hindering access to the platform when in the second door position;
    a first camera connected to the platform, the first camera capturing a first field of view including at least part of the platform and at least part of an adjacent product location when the platform is at a first platform position;
    a positioning system connected to the platform such that the platform is movable by the positioning system between each of the plurality of product locations and the dispensing area;
    a controller including a processor and memory, the memory including instructions, the controller communicably connected to the first camera and the positioning system; and
    a network connector for connecting the first camera and controller to a database through a network.

2. The automated store of claim 1 further comprising a second camera connected to the platform and communicably connected to the controller and network connector and capturing a second field of view, wherein, when the platform is at the second platform position and the security door is in the second door position, the second field of view includes at least part of the platform and at least part of the dispensing area.

3. The automated store of claim 1 further comprising a third camera connected to the platform and communicably connected to the controller and network connector and capturing a third field of view including an interior area of the automated store between the plurality of product locations and a front panel.

4. The automated store of claim 1, wherein the platform includes a flap movable from a first flap position to a second flap position, the second flap position inclined such that when the platform is in the second flap position, the flap slants downward in a direction toward the dispensing door.

5. The automated store of claim 1 further comprising a user interface and an electronic lock communicably connected to the network connector, the electronic lock controllable using the user interface and through a network.

6. The automated store of claim 1, further comprising a sensor associated with the platform, the sensor one of: an infrasonic sensor, a capacitive sensor, an infrared sensor, a magnetic sensor, or an optical sensor.

7. The automated store of claim 1, further comprising a sensor associated with each of the plurality of product locations, the sensor one of: an infrasonic sensor, a capacitive sensor, an infrared sensor, a magnetic sensor, or an optical sensor.

8. A method comprising:
    providing an automated store comprising:
        a plurality of product locations;
        a platform within the automated store and movable between a plurality of first platform positions and a second platform position adjacent to a dispensing area, each first platform position being adjacent to a product location;
        a security door with a first door position and a second door position, the security door hindering access to the platform through the dispensing area when in the first door position and not hindering access to the platform when in the second door position;
- a first camera connected to the platform, the first camera capturing a first field of view including at least part of the platform and at least part of an adjacent product location when the platform is at a first platform position;
- a positioning system connected to the platform such that the platform is movable by the positioning system between each of the plurality of product locations and the dispensing area;
- a controller including a processor and memory, the memory including instructions, the controller in communication with the first camera and the positioning system; and
- a network connection connecting the first camera and controller to a database through a network;

acquiring, by the controller, first images from the first camera; and storing, by the controller, the acquired first images in the database.

9. The method of claim 8, wherein the first images are acquired when the platform is at the first platform position adjacent to the product location, the method further comprising:
  analyzing, by the controller, the acquired first images to develop data representing the position of the platform with respect to the product location; and
  directing, by the controller using the developed data, the positioning system to move the platform with respect to the shelf position.

10. The method of claim 8, wherein the acquired first images include images of a product, the method further comprising:
  analyzing the acquired first images to identify a product dispensed to a customer.

11. The method of claim 10, wherein the acquired first images are analyzed by an administrator to identify the product dispensed to a customer.

12. The method of claim 10, wherein the acquired first images are analyzed by an image recognition module executing on a server to identify the product dispensed to a customer.

13. The method of claim 8, wherein the acquired first images include images of a product, the images being accessible by a mobile application.

14. The method of claim 8, wherein the acquired first images include images of a plurality of transfers of product from the product location to the platform, the images being analyzed to develop instructions for improving the transfer of product from the product location to the platform, the method further comprising:
  receiving, by the controller, the developed instructions; and
  adjusting, by the controller using the developed instructions, a transfer of product from the product location to the platform.

15. The method of claim 14, wherein the adjusting the transfer of product includes at least one of:
  adjusting, by the controller, a speed of transfer of product from the product location to the platform; or
  adjusting, by the controller, a position of the platform during the transfer of product from the product location to the platform.

16. The method of claim 8, wherein the provided automated store further comprises a second camera connected to the platform and in communication with the controller and network connection and including a second field of view, wherein, when the platform is at the second platform position and the security door is in the second door position, the second field of view includes at least part of the platform and at least part of the dispensing area, the method further comprising:
  acquiring, by the controller, second images from the second camera; and
  storing, by the controller, the acquired second images in the database.

17. The method of claim 16, wherein the second images are acquired when the platform is at the second platform position adjacent to the dispensing area, the method further comprising:
  analyzing, by the controller, the acquired second images to develop data representing the position of the platform with respect to the dispensing area; and
  directing, by the controller using the developed data, the positioning system to move the platform with respect to the dispensing area.

18. The method of claim 16, wherein the acquired second images include images of a product, the method further comprising:
  analyzing the acquired second images to identify a product dispensed to a customer.

19. The method of claim 18, wherein the acquired second images are analyzed by an administrator to identify the product dispensed to a customer.

20. The method of claim 18, wherein the acquired second images are analyzed by an image recognition module executing on a server to identify the product dispensed to a customer.

21. The method of claim 16, wherein the acquired second images include images of a product, the images being accessible by a mobile application.

22. The method of claim 16, wherein the acquired first images include images of a plurality of transfers of product from the platform to the dispensing area, the images being analyzed to develop instructions for improving the transfer of product from the platform to the dispensing area, the method further comprising:
  receiving, by the controller, the developed instructions; and
  adjusting, by the controller using the developed instructions, a transfer of product from the platform to the dispensing area.

23. The method of claim 22, wherein the adjusting the transfer of product includes at least one of:
  adjusting, by the controller, a speed of transfer of product from the platform to the dispensing area; or
  adjusting, by the controller, a position of the platform during the transfer of product from the platform to the dispensing area.

* * * * *